US012782656B2

(12) United States Patent
Kumar et al.

(10) Patent No.: US 12,782,656 B2
(45) Date of Patent: Nov. 3, 2026

(54) MULTI-FUNCTIONAL DEVICE MOUNT AND APPARATUS UTILIZING SAME

(71) Applicant: Bruker Nano, Inc., Santa Clara, CA (US)

(72) Inventors: Swathy Sampath Kumar, Mountain View, CA (US); David Cheng, Mountain View, CA (US); Jonathan Nassi, Mountain View, CA (US); Koen Visscher, Mountain View, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 325 days.

(21) Appl. No.: 18/642,296

(22) Filed: Apr. 22, 2024

(65) Prior Publication Data

US 2024/0361543 A1 Oct. 31, 2024

Related U.S. Application Data

(60) Provisional application No. 63/461,675, filed on Apr. 25, 2023.

(51) Int. Cl.
*G02B 6/42* (2006.01)
*G02B 6/35* (2006.01)

(52) U.S. Cl.
CPC ............. *G02B 6/424* (2013.01); *G02B 6/354* (2013.01); *G02B 6/422* (2013.01)

(58) Field of Classification Search
CPC ......... G02B 6/424; G02B 6/354; G02B 6/422
See application file for complete search history.

(56) References Cited

U.S. PATENT DOCUMENTS

D182,960 S 6/1958 Huber
3,104,122 A 9/1963 Daniels
(Continued)

FOREIGN PATENT DOCUMENTS

JP D1630026 4/2019
JP D1683188 4/2021

OTHER PUBLICATIONS

B & H Foto & Electronics Corp., Niceyrig 15mm Single Rod Clamp with Shoe Mount Plate, https://www.bhphotovideo.com/c/product/1660081-REG/niceyrig_457_15mm_single_rod_clamp.html, 2024, 3 pages.
(Continued)

*Primary Examiner* — Sung H Pak
(74) *Attorney, Agent, or Firm* — Quarles & Brady LLP; Yakov S. Sidorin

(57) ABSTRACT

A system including a device configured to be partially inside of a target object (and to remain affixed to such object substantially irremovably and in an unchanged orientation with respect to such object at least on a time-scale comparable to term of life or use of the target object itself) to provide chronic access to an internal object location from an outside location and communication with such location along multiple communication channels that are spatially separate and substantially immovable with respect to one another while remaining moveable together and synchronously with the object. Delivery of electromagnetic energy and a material stimulus along the first and second communication channels is carried out such as to necessarily maintain unchanged mutual spatial positioning and orientation between the channels regardless of whether the channels are being used or not and regardless of whether the target object—together with these channels—is spatially repositioned.

27 Claims, 20 Drawing Sheets

(56) References Cited

U.S. PATENT DOCUMENTS

| | | | | |
|---|---|---|---|---|
| D244,577 | S | 6/1977 | Glumac | |
| 5,195,708 | A | 3/1993 | Marsh | |
| 5,269,488 | A | 12/1993 | Lach | |
| D344,886 | S | 3/1994 | Sachs | |
| 5,307,803 | A * | 5/1994 | Matsuura | A61B 1/0051 600/146 |
| D382,288 | S | 8/1997 | Usui | |
| 6,362,791 | B1 | 3/2002 | Patterson | |
| D631,905 | S | 2/2011 | Sandell | |
| D689,853 | S | 9/2013 | Smith | |
| D719,605 | S | 12/2014 | Dordick | |
| D788,206 | S | 5/2017 | Wengreen | |
| D815,087 | S | 4/2018 | Gu | |
| 10,682,197 | B2 | 6/2020 | Trulson et al. | |
| 11,197,735 | B2 | 12/2021 | Trulson et al. | |
| D967,245 | S | 10/2022 | Thorne | |
| D991,325 | S | 7/2023 | Ramsauer et al. | |
| 11,690,696 | B2 | 7/2023 | Trulson et al. | |
| 2021/0059578 | A1 | 3/2021 | Nassi et al. | |
| 2022/0104907 | A1 | 4/2022 | Trulson et al. | |
| 2022/0387127 | A1 | 12/2022 | Kao et al. | |

OTHER PUBLICATIONS

B & H Foto & Electronics Corp., Wooden Camera Easyrig Collar Mount for Safety Dovetail Plates, https://www.bhphotovideo.com/c/product/1476254-REG/wooden_camera_271300_easy_rig_collar_mount.html, 2024, 3 pages.

* cited by examiner

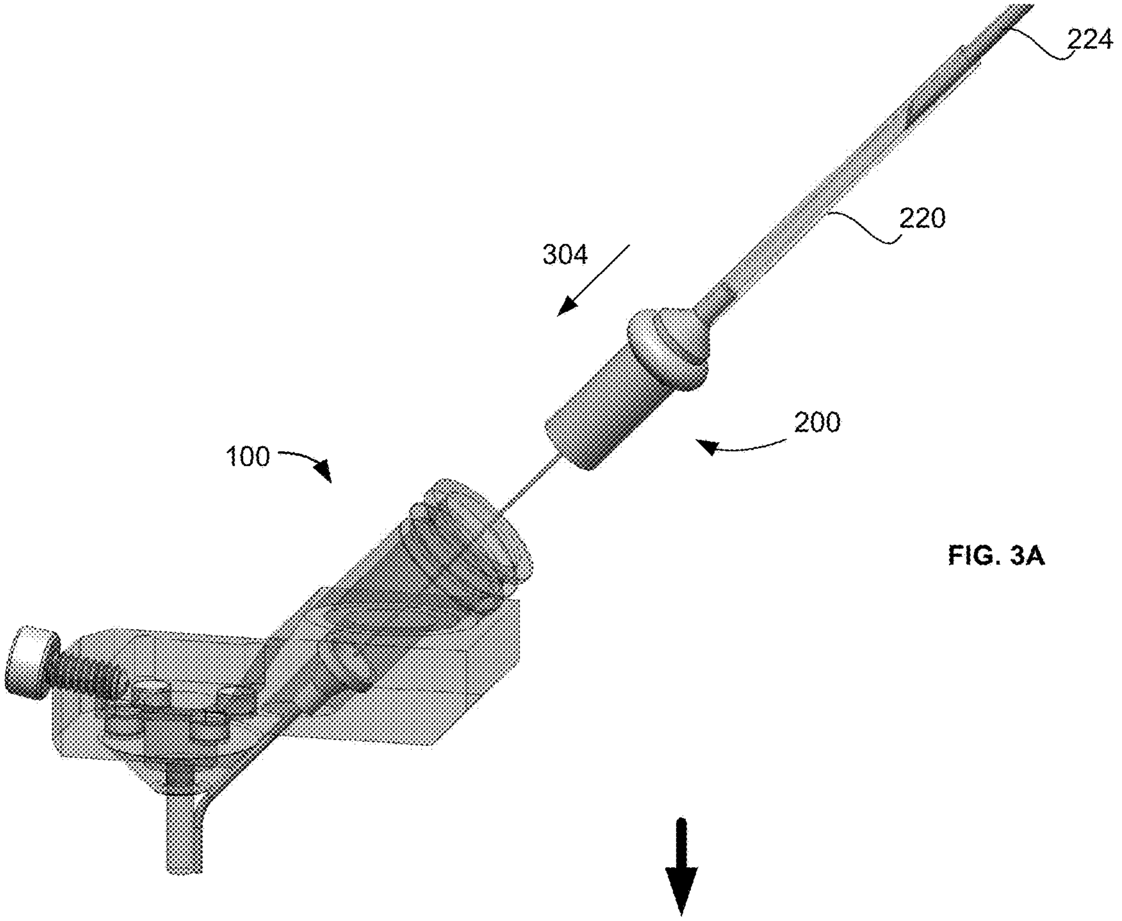
FIG. 3A
FIG. 3B
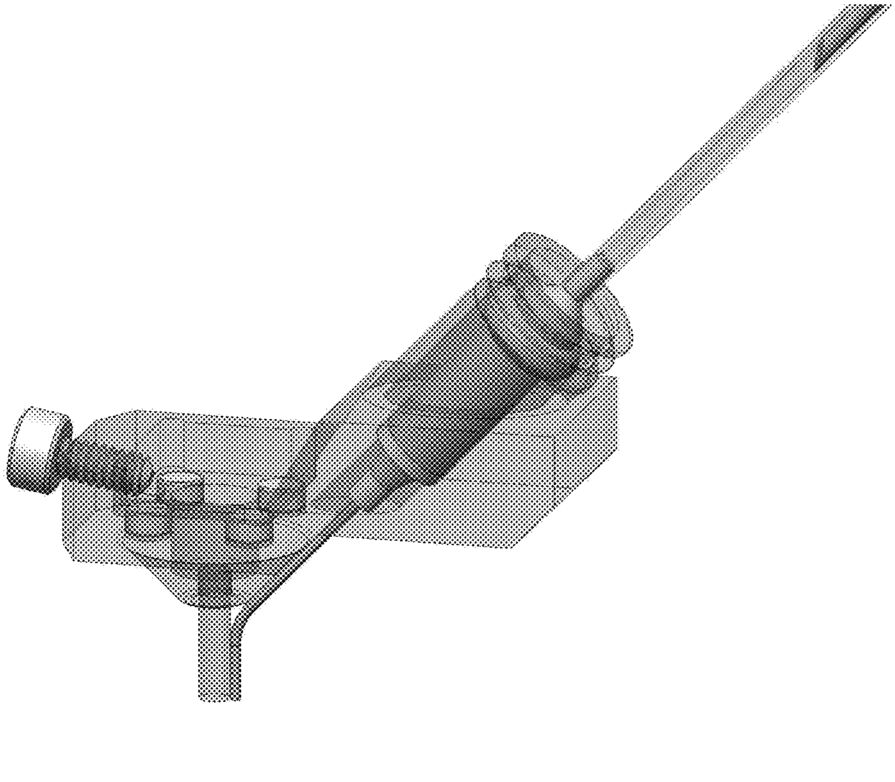

From FIG. 6C

To FIG. 6A

FIG. 7
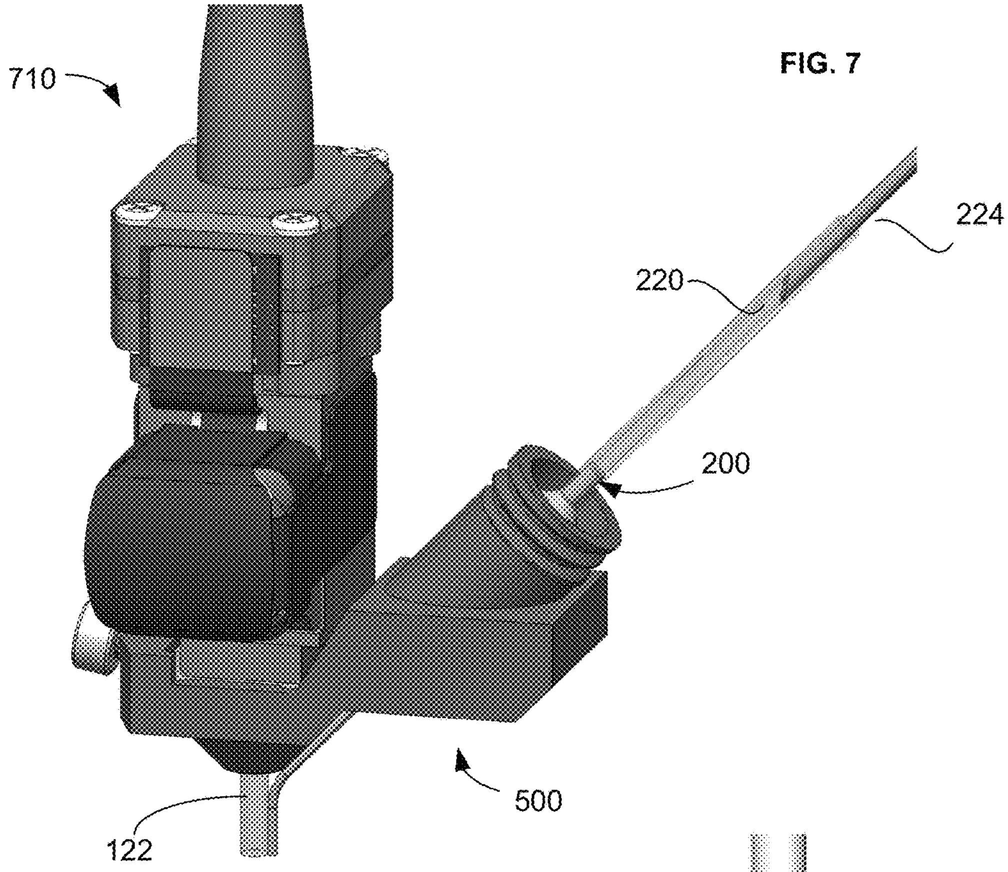
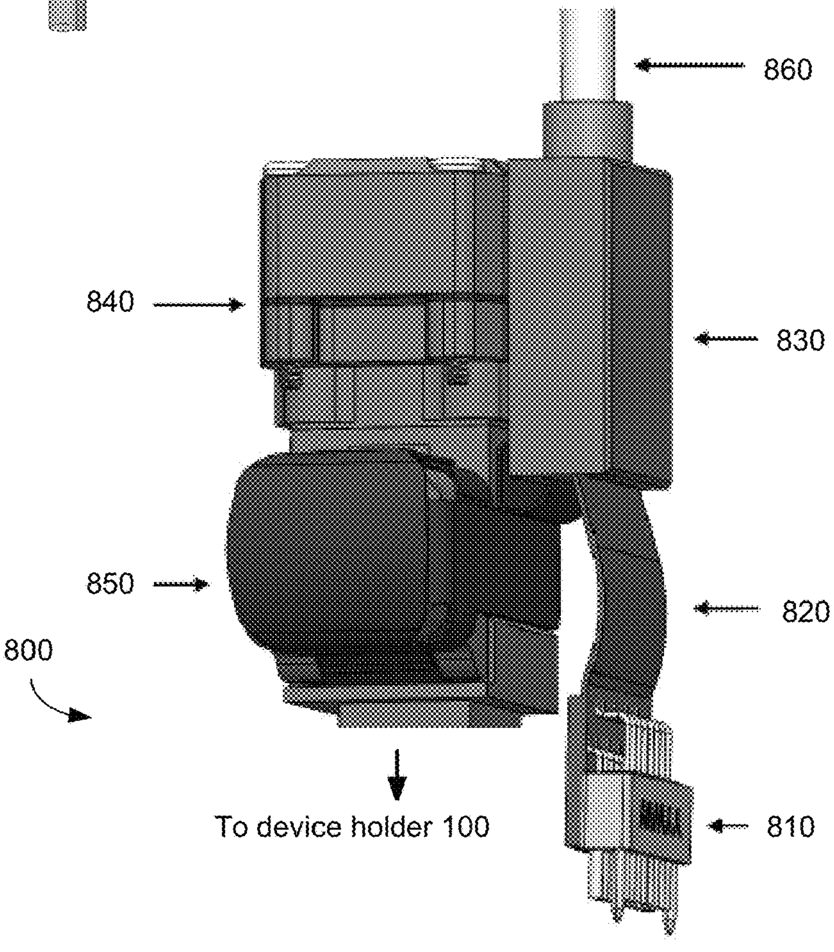
FIG. 8

MULTI-FUNCTIONAL DEVICE MOUNT AND APPARATUS UTILIZING SAME

CROSS-REFERENCE TO RELATED APPLICATIONS

This US Patent application claims priority form and benefit of the U.S. Provisional Patent Application No. 63/461,675 filed on Apr. 25, 2023, the disclosure of which is incorporated herein by reference.

TECHNICAL FIELD

The present invention relates to a structure configured to facilitate repeatable, multiple, chronic (that is, persisting for a long time or recurring) examination of and/or influencing a target object with the use of electromagnetic energy and/or pre-identified matter through a device (generally referred to in this disclosure as an interrogating apparatus or device, or an interrogator, for short) that is judiciously configured to gain access to the target object with the use of such structure and, more particularly, to a system or apparatus that includes a device mount dimensioned to be inserted and/or implanted into the target object and affixed thereto substantially immovably to be repositioned with the target object regardless of whether the interrogator is or is not structurally cooperated with the device mount.

RELATED ART

Observation and/or interrogation of various objects-whether animate (such as a chosen biological tissue) or inanimate (such as a nonliving material object) often requires not only the freedom to image such object (using, as a non-limiting example, various optical imaging arrangements when such observation is carried out in an optical portion of the electromagnetic spectrum) but also the ability to stimulate a target portion of an object being observed with electromagnetic energy (again, for example—light, whether in the visible, infra-red, or ultraviolet portions of the spectrum) and/or to deliver to the target portion another form of stimulus (for example, a chosen chemical, which may or may not be activatable or photoinduced by that very electromagnetic energy) in order to observe the reaction of the object on the stimulus/stimuli. When the object is a biological sample, the stimulation of the object with light can be used to initiate/trigger, enhance, and/or inhibit or even cease an activity of a target portion of the biological sample: for example, nerve cells are known to respond to (be activated or deactivated by) light energy and/or communicate signals based on activation by light energy, while activities of such cells may be affected by interaction with a different types of stimuli such as, for example, dyes or drugs. A typical application of such observation and/or interrogation is provided by optogenetics-related uses.

SUMMARY OF THE INVENTION

Embodiments of the invention provide a system or apparatus that includes a hand-held device holder. Such holder contains a holder body having an outer surface, a first input port, a second input port, a first output port, and a second output port. The first input port has a first axis, at least two connectors that are disposed in a surface transverse to the first axis and that are configured to removably cooperate an external interrogator apparatus therewith, and a first input port aperture in such surface. The second input port has a second axis transverse to the first axis and containing a substantially cylindrical hollow along the second axis. The first output port includes an optical element protruding along the first axis outside the outer surface of the device holder and substantially inseparably and/or permanently cooperated with the first input port at the first input port aperture in optical communication with the first input port aperture, while the second output port is dimensioned as a tubular element protruding along the second axis outside the outer surface and substantially inseparably and/or permanently cooperated with the second input port such that a portion of the tubular element is substantially co-axial with the cylindrical hollow of the second input port. Optionally, the first and second axes are not perpendicular to one another and/or are not parallel to one another. Optionally, the first input port aperture is defined in a first plane and a second input port aperture is defined in a second plane that is substantially transverse to the first plane. In one implementation of the system, a combination of a distal end of the first output port and a distal end of the tubular element of the second output port is configured such as to substantially prevent a relative movement therebetween and/or between a chosen distal end of the combination and the holder body (thereby defining such combination as rigid construction that is necessarily substantially immovable with respect to the outer surface). Alternatively or in addition, and substantially in every implementation of the system, the first input port may include a guiding structure dimensioned to receive and/or accept a housing of the external interrogator apparatus (for example, the apparatus configured as a microscope) upon repositioning of the housing along the first axis while substantially preventing the housing from being translated laterally with respect to the first axis. (In one specific case of the latter, the guiding structure may be dimensioned as a closed wall that is substantially parallel to the first axis and/or defined in the outer surface.) Alternatively or in addition, and substantially in every embodiment of the system, (A) the second input port may include a funnel surface substantially co-axial with the second axis, and/or (B) at least one of the following conditions may be satisfied:—the first output port is substantially symmetric about the first axis;—the first output port includes a substantially cylindrical portion made of an optically transparent material;—the first output port includes an optical prism;—an output surface of the first output port is transverse to the first axis; and/or (C) at least one of the following conditions is satisfied:—the second output port includes a metallic pipe or capillary;—the distal end of the tubular structure of the second output port has a third axis that is substantially parallel to the first axis;—an output edge of the distal end of the tubular structure is in a surface that is substantially flush with an output surface of the distal end of the first output port. Alternatively or in addition, a second portion of the tubular structure of the second output port is configured to be substantially parallel to the first axis and/or an output edge of the distal end of the tubular structure defines a plane that substantially coincides with a plane of an output surface of the distal end of the first output port.

Optionally, substantially every embodiment of the system may be structured such that at least two connectors include magnets cooperated at said surface, and/or these at least two connectors are positioned at the surface substantially symmetrically with respect to the first axis.

Alternatively or in addition, at least one implementation of the system may additionally include a fluid delivery device. Such fluid delivery device is structured to contain a tubular channel that is dimensioned to be removably inserted into the second input port and that, upon translation along the second axis, is removably housed by and within the second output port. The tubular channel is dimensioned such that (when a proximal retaining element of the fluid delivery device is cooperated with the second input port to affix the fluid delivery device therein and/or temporarily immobilize the fluid delivery device therein) an output aperture of the tubular channel is not inside the tubular structure or is substantially flush with an output aperture of the tubular structure. An embodiment of the system may further include a plug device that contains a flexible rod of material (dimensioned to be removably inserted into the second input port and, upon translation along the second axis, removably housed by and within the second output port) and a head of the plug device supporting a proximal end of the flexible rod of material (the head being dimensioned to fittingly close a hollow of the second input port when the flexible rod of material is removably inserted therethrough and into the tubular element of the second output port). Furthermore, at least one embodiment of the system may include the external interrogator apparatus that is dimensioned to fit into the first input port in contact with the surface transverse to the first axis. Such external interrogator device is configured (i) to deliver light between an optical component of the interrogator apparatus and the first output port through the aperture, and/or (ii) when the first output port contains a thin-film coating configured as an electrode, to electrically connect the thin-film coating to electronic circuitry of the system. (Optionally, the interrogator apparatus includes a microscope and/or a hub device operably connecting the thin-film coating when the interrogator apparatus is inserted into the first input port.) Optionally, in at least one embodiment of the system, the at least two connectors include magnets and/or openings in or at the surface transverse to the first axis.

Embodiments of the invention additionally include a method for using a hand-held device holder (partially placed into a body of a target object such that both first and second output ports of the holder are located below an outer surface of the body of the target object while a portion of an outer surface of a holder body is substantially in contact with the outer surface of the body of the target object) to carry out at least the following steps: propagating an electromagnetic signal to impinge on a target area of the target object through an aperture formed in a first surface of the holder that is transverse to a first axis and that is located between the target area and a first input port of the holder (here, the target area is at least partially within a field-of view of an optical element of the first output port), and delivering a first pre-defined substance to the target area through the second input port of the holder and through a tubular element of the second output port without having the first pre-defined substance come in contact with an inner surface of the tubular element. In at least one implementation of the method, each of the steps of propagating and delivering is carried out without repositioning and/or reorienting the hand-held device holder. (Optionally, the step of delivering includes delivering a second pre-defined substance through the second input port to the target area without having the second pre-defined substant come in contact with the inner surface of the tubular element of the second output port (such delivering the second pre-defined substance being carried out after heaving ceased the delivering the first pre-defined substance.) Alternatively or in addition, an embodiment of the method may additionally include a) a step of removably inserting a fluid delivery device having a tubular channel into the tubular element of the second output port prior to transmitting a pre-defined substance of the first and second pre-defined substances through the tubular channel and/or b) when the tubular element of the second output port is empty, a step of removably positioning a flexible rod of a plug device therein by translating the rod along the second axis through the second input port. (In the latter case, at least one embodiment of the method may further include a step of fittingly cooperating (substantially simultaneously with the step of removably positioning) a head of the plug device, attached to a proximal end of the flexible rod, with a hollow of the second input port such as to substantially removably close the hollow. Alternatively or in addition, and substantially in every implementation of the method, each of propagating a chosen pre-determined substance and delivering the chosen pre-determined substance to the target area through the second input port of the holder and through the tubular element of the second output port may be carried out without repositioning and/or reorienting the hand-held device holder. Alternatively or in addition, and substantially in every implementation of the method, at least one of the following conditions can be satisfied: (i) the propagating includes propagating light to and/or from the target area through the optical element and the aperture; and/or (ii) the propagating includes propagating an electrical signal through the aperture along an electrically-conducting element when said electrically-conducting member is carried by the optical element. (At least in one specific case, the step of propagating light to and/or from the target area may include propagating light through an objective of a microscope removably affixed in the first input port such as to be supported at said target object with only said hand-held device holder.) Moreover, in at least one of the implementations of the method, at least one of the steps of delivering a chosen pre-defined substance to the target area includes delivering a fluid.

Embodiments additionally provide an optogenetic apparatus that includes a device holder and an interrogation device. The device holder has a first input port configured to receive along a first axis and removably affix therein the interrogation device, a first output port including an optical lens that is substantially coaxial with the first axis, a second input port having a hollow with a second axis that is inclined with respect to the first axis, and a second output port fluidly connected with the second input port and including a tubular structure extending along the first axis. The interrogation device is dimensioned to fit into the first input port and is configured to deliver light from an optical component of the interrogation device and through the optical lens, and/or—when the first output port contains a thin-film coating configured as an electrode—to electrically connect said thin-film coating to electronic circuitry of said apparatus. Embodiments further provide a method of use of such optogenetic apparatus, which includes delivering light between a microscope system of the interrogation device and a target area defined by a field-of-view of the optical lens; and subjecting the very same target area to interaction with a pre-determined substance by delivering the pre-determined substance through the second input port and the second output port without making contact between the pre-defined substance and either of the hollow and an inner surface of the tubular structure.

BRIEF DESCRIPTION OF THE DRAWINGS

The invention will be fully understood by referring to the following Detailed Description of Specific Embodiments in conjunction with the Drawings, of which:

FIGS. 3A, 3B show spatial coordination and mating between the embodiment of an infusion-cannula adapter component and the body of the device holder.

FIG. 7 provides a stereoscopic view of an interrogator spatially removably cooperated with (docked at) an embodiment of the device holder.

FIG. 8 illustrates a portion of an embodiment of an apparatus that includes an interrogator configured as a microscope and/or an electrophysiology-scope with on-board electronic circuitry.

Figure 1A:
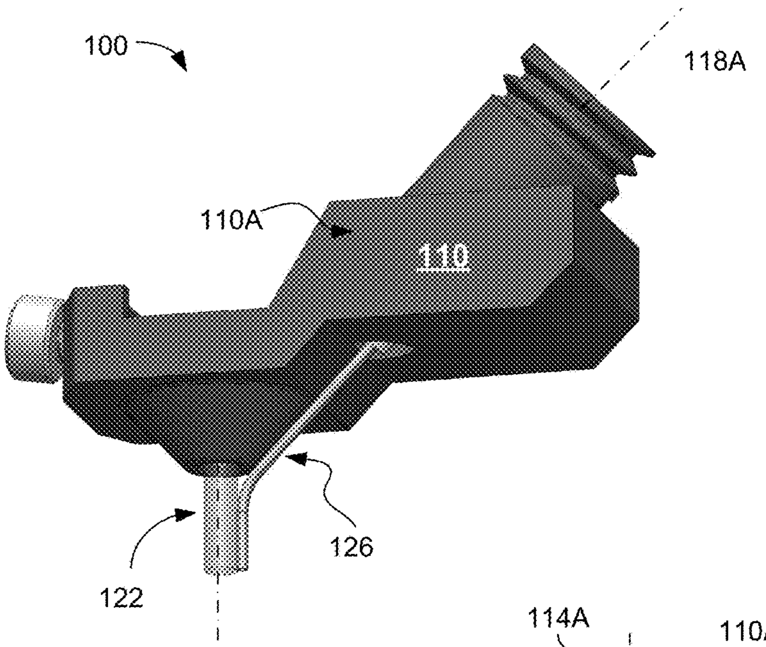
FIGS. 1A, 1B, 1C schematically illustrate a body of an embodiment of the device holder in distinct perspective views.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

While the implementations of the idea of the invention are discussed on the specific examples pertaining to engaging (optically and/or chemically) a biological tissue as the most vivid example of the use of the proposed approach, a person of skill will readily appreciate that the scope of the invention is intended to include and cover the use and application of the discussed device(s) and/or methodology(y/ies) to substantially any practical situation in which the engagement of the element of a target object (whether animate or inanimate) is conducted with the use of light and some composition of matter delivered through the described below channels to the target object.

Although the related art has already provided some examples of implantable probe modules configured for calcium imaging as well as optogenetic modulation of a biological tissue (for example, neurons at the chosen location of the brain in a freely behaving rodents), the ability to reliably influence the very same location (that is addressed optically) but now with a chosen material stimulus—such as, for example, a drug—and to multiply repeat the temporally overlapping or separated in time processes of stimulation and optical imaging/modulation of the very same location has remained operationally deficient and, for that reason, unreliable. Indeed, related art simply does not ensure, let alone guarantee, that the field-of-view of an optical system of a particular microscope used for imaging and the target site of a channel used for delivery of the chosen material stimulus may coincide or even sufficiently spatially overlap time and time again—at least for the reason that the use of an interface structure employed by the microscope and that employed by the injector of the stimulus (that is different from electromagnetic energy) remain spatially uncoordinated. For example, analysis of methodologies of related art demonstrate that the interface used as a support for a removable attachment of the microscope to the target object is often removably cooperated with the interface optical system (used to deliver light between the microscope and the target object) after such interface optical system has been already spatially coordinated with the object (US 2021/0059578), and/or that implantation of the interface optical system is made repeatable while the channel for delivery of the chosen material stimulus may even be not considered as a part of any of these two interfaces at all (US 2022/0104907; U.S. Pat. No. 11,197,735). The necessarily following, as the consequence, inadequacy and unpredictability of results of performing calcium imaging and/or optogenetic modulation of the target object begs a question of yet undefined and unrealized changes in both the equipment and procedure(s) conventionally used in related art.

The persisting inability of the systems of related art to ensure that a first internal area of the target object that is affected with the use of electromagnetic energy (for example, visually perceived) and a second internal area of the target object that is affected or interacts with a chosen material stimulus inevitably and repeatedly and reliably remain the same area is solved with the use of embodiments of the present invention. To this end, methods and apparatus are disclosed for a miniaturized device configured to be substantially permanently affixed to and partially inside of a target object (that is, intended to remain affixed to such object substantially irremovably and in an unchanged orientation with respect to such object substantially indefinitely—or, at least on a time-scale comparable to the term of life or use of the target object itself) to provide repeatable, chronic access to an internal area and/or volume of the target object from a location outside of the target object and the miniaturized device and communication between such internal area/volume and the location outside of the target device along multiple communication channels that are spatially separate and substantially immovable with respect to one another while remaining moveable together and synchronously with the object. The employed methodology employs the single—the only—process of implantation, into the target object, of a portion of an embodiment of the device that contains both the channel configured to propagate the electromagnetic energy and the channel configured to propagate the material stimulus such these first and second channels necessarily maintain unchanged mutual spatial positioning and orientation regardless of whether these channels are being used or not and regardless of whether the target object—together with these channels—is being spatially repositioned.

An implementation of an apparatus of the invention manifests as containing a device holder, which in a very specific case is structured to be spatially cooperated with and substantially permanently mounted on a target object (as a non-limiting example—an animate object, for example a biological object such as head of a preclinical animal models) only once (that is, without re-implantations and/or re-attachment, in stark contradistinction with related art) and is judiciously configured to provide mechanical and functional support both for an interrogator device (such as an optogenetic microscope and/or an electrophysiology unit) and a spatially and functionally independent system configured to establish fluid delivery at and/or to the target site (which is an area and/or volume inside the target object) of a single-color or multiple-color calcium imaging and/or optogenetics. Embodiments of the device holder may be configured, for example, to enable simultaneous or time-independent from one another delivery of fluids (such as viral particles, dyes, drugs, miRNA/siRNA etc.) and calcium imaging and/or optogenetics in freely-moveable target object.

Notably, the subject matter of this disclosure technically relates to that of the U.S. patent application Ser. No. 17/843,819 filed on Jun. 17, 2022 (and now published as US 2022/0387127), which is a continuation-in-part of the U.S. patent application Ser. No. 17/484,791 filed on Sep. 24, 2021 and now granted as U.S. Pat. No. 11,690,696; to the U.S. patent application Ser. No. 17/020,978 filed on Sep. 15, 2020 and now published as US 2021/0059578; and to the U.S. patent application Ser. No. 16/851,678 filed on Apr. 17, 2020 and now granted as U.S. Pat. No. 11,197,735. The disclosure of each of the above-identified patent documents is incorporated herein by reference.

Figure 1B:
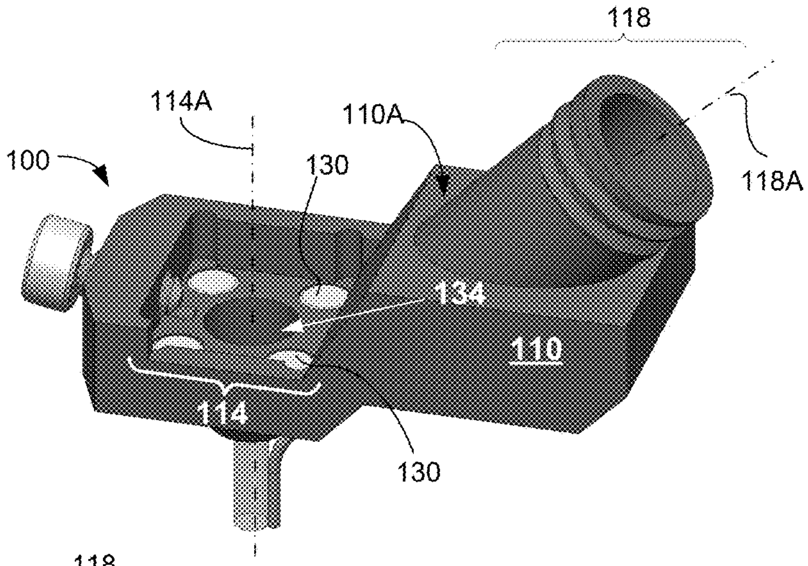
Figure 1C:
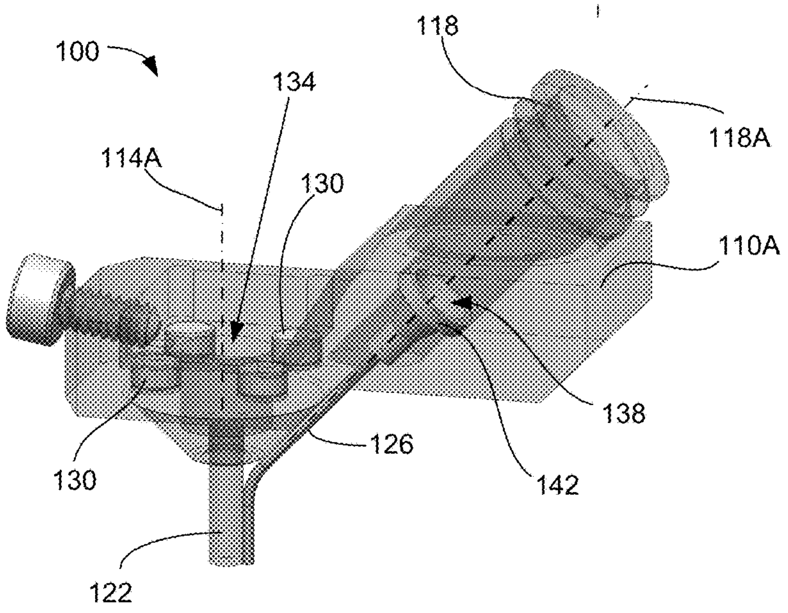

Referring to the example of an embodiment 100 of the hand-held device holder, portions and/or components of which are illustrated in several perspective views in FIGS. 1A, 1B, and 1C, the device holder body 110 has an outer surface 110A and multiple input and output ports cooperated with such surface. The multiple ports include at least a first input port 114 having a first axis 114A, a second input port 118 having a second axis 118A that is transverse to the first axis 114A, and a first output port 122 that contains an optical element protruding along the first axis 114A outside the outer surface 110A. The multiple ports also include a second output port 126 port dimensioned as a tubular element protruding along the second axis 118A outside the outer surface 110A.

The first input port 114 may include at least two connectors 130 (as shown in the example of FIGS. 1A-1C—four connectors) that are disposed in a surface of the first input port 114 (such surface being transverse to the first axis 114A) and configured to removably cooperate an external interrogator device/apparatus (not shown for simplicity of illustration) with the port 114, as well as an aperture 134 in this surface. In at least one specific case, the aperture 134 corresponds to an opening formed throughout the body 110. Generally, the input port 114 includes a guiding structure dimensioned to accept a housing of the external interrogator apparatus (not shown) therein upon repositioning of such housing along the axis 114A while, at the same time, substantially preventing the housing of the interrogator apparatus from being translated laterally with respect to the axis 114A. As shown in the non-limiting example of FIGS. 1B and 1C, such guiding structure may be dimensioned as a bore (optionally—a blind bore) defined at least in part by a closed wall (as shown—a wall having a substantially rectilinear shape) formed in the surface 110A. In the presented example, the aperture 134 is formed in the bottom of the bore.

The second input port 118 is dimensioned to contain a hollow (in the non-limiting example of FIGS. 1A-1C—a substantially cylindrical hollow) along the axis 118A and, in at least one specific embodiment, a funnel surface 138 (shown in FIG. 1C as a substantially conical surface) converging onto the axis 118A at a point inside the body 110 that is opposite the input opening of the port 118, thereby reducing (preferably, in a substantially spatially-monotonic fashion) the cross-sectional dimension of the hollow upon the transition from the input opening of the port 118 towards the tubular element of the second output port 126. Such funnel surface may be formed within the body 110 itself or, alternatively (and as shown in the example of FIG. 1C) be defined in a component 142, which is integrated within the hollow of the port 118 and to which an end of the tubular element of the second output port 126 is affixed inside the body 110. The output apertures of the ports 122, 126 may or may not be defined in the same plane and may or may not be inclined with respect to the corresponding local axes of the distal ends of such ports. (The illustrations of the specific non-limiting case of the mutual orientation of the output ports 122, 126 in FIGS. 1A-1C depict the distal ends of these ports having corresponding local axes that are substantially parallel to one another, and having corresponding output apertures that are defined in substantially parallel planes.) Notably, apertures of the first input port and of the second input port are at least separated from the outer surface by respectively corresponding different distances and/or are defined in respectively corresponding planes that intersect one another.

The optical element of the first output port 122 (shown in the example of FIGS. 1A, 1B, 1C as a solid rod of optically-transparent material) is configured to be substantially inseparably and/or permanently cooperated with the first input port 114 at the aperture 134 (and/or at the opening formed throughout the body 110) in optical communication with the aperture 134, while the second output port 126 is substantially inseparably and/or permanently cooperated with the second input port 118 such that at least portion of the tubular element of the port 126 is substantially co-axial with the cylindrical hollow of the second input port 118. Notably, in at least one specific case the axes 114A and 118A are not perpendicular to one another. Generally, however, the first output port may be dimensioned to be substantially symmetric about the first axis, and/or to include a substantially cylindrical portion made of an optically transparent material, and/or to include an optical prism and/or to have an output facet transverse to the axis of the port 122 (as illustrated in an example discussed below). In at least one specific case, the first output port 122 may be defined at least in part by an optical element (of the first output port) that protrudes along the axis 114 outside the outer surface 110A of the body 110 of the device holder 100 while (i) an outer surface of the first output port is configured to carry a thin-film coating dimensioned as a set of electrically-conducting members (that is, the set defined to include one or more of electrically-conducting members), and/or (ii) the output facet of the first output port 122 is configured to carry another thin-film coating electrically connected with the thin-film coating on the outer surface of the port 122, and/or (iii) at least one of these two thin-film coatings is substantially optically opaque. In one specific case, the first output port 122 is fully or completely defined by a substantially cylindrical optically-transparent solid element (and thus does not include any other element of component).

The orientations of the optical axis of the optical element of the port 122 and the axis of the tubular element of the port 126 may be judiciously chosen such as to have these two axes be spatially separated from one another outside of the bottom portion of the outer surface 110A by a distance preferably not exceeding a diameter of this optical element and/or a diameter of the tubular element, or even cross each other thereby ensuring that a projection of the opening of the tubular element of the port 126 onto the object space outside the body 110 substantially overlaps with a field-of view defined by the optical element of the port 122 in such object space. As a result, in operation of the device holder that has been implanted in and substantially permanently secured at the target object (and when the external interrogator apparatus is removably cooperated with the body 110 at the first input port 114 and the delivery of the chosen material stimulus is carried out through the second input port 118), the imaging area/volume within the target object that is viewed/optically affected through the output port 122 is made to necessarily spatially overlap or even match or is substantially congruent with the area/volume within the target object that receives the material stimulus (a predetermined chemical substance, for example) through the output port 126, in advantageous contradistinction with operation of apparatus of related art.

In at least one specific case, the second output port 126 includes a pipe or capillary made of bio-compatible metal and/or rigid plastic. In substantially every implementation, the combination of a distal free end of the first output port 122 and a distal free end of the tubular element of the second output port 126 may be (and preferably is) configured such as to substantially prevent a relative movement between the two and/or between every of these two distal ends and the body 110, thereby defining such combination of the distal ends of the ports 122, 126 as a rigid construction that is necessarily substantially immovable with respect to the outer surface 110A. For example, the port 126 may be structured as a custom, rigid, stainless-steel cannula having the outer diameter (O.D.) smaller than 1 mm (for example, smaller than 0.5 mm, in one specific case—of about 0.35 mm) and the inner diameter (I.D.) smaller than 0.5 mm (preferably smaller than 0.3 mm, in one case—of about 0.21 mm), that is secured to the side of the GRIN lens of the output port 122.

The multiple connectors 130, configured to facilitate the removable positioning and affixation of the external interrogator apparatus within the input port 114 may include, for example, threaded holes and/or magnets juxtaposed with the body 110 (oriented, in one specific case, substantially symmetrically with respect to the axis 114A); alternatively or in addition, such connectors may include clips as discussed in, for example, US 2022/0387127.

Figure 2A:
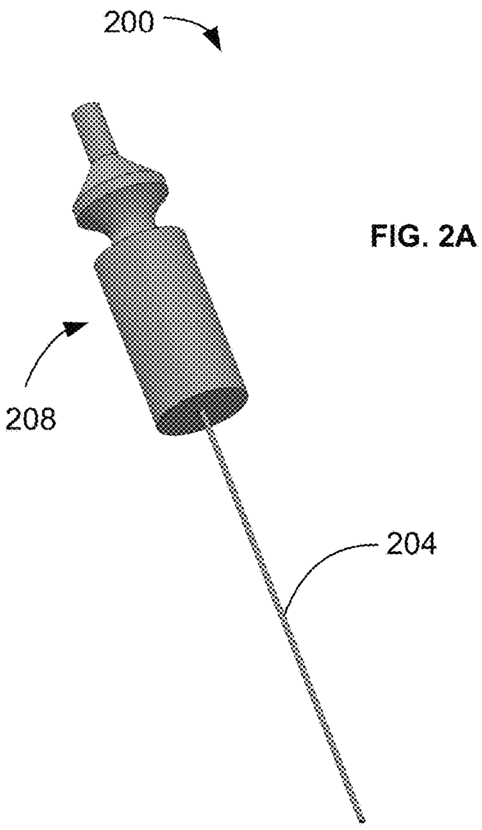
FIGS. 2A, 2B, 2C, and 2D show elements of an embodiment of an infusion-cannula adapter component dimensioned for use with the body of FIGS. 1A through 1C.
Figure 2B:
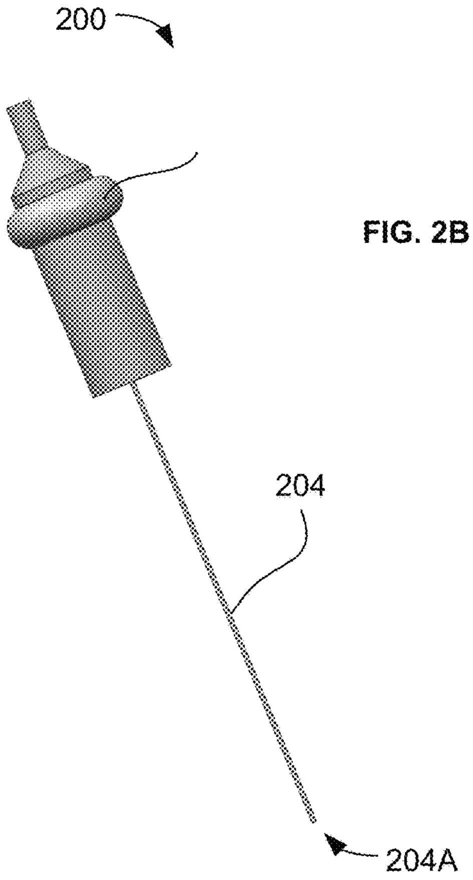
Figure 2C:
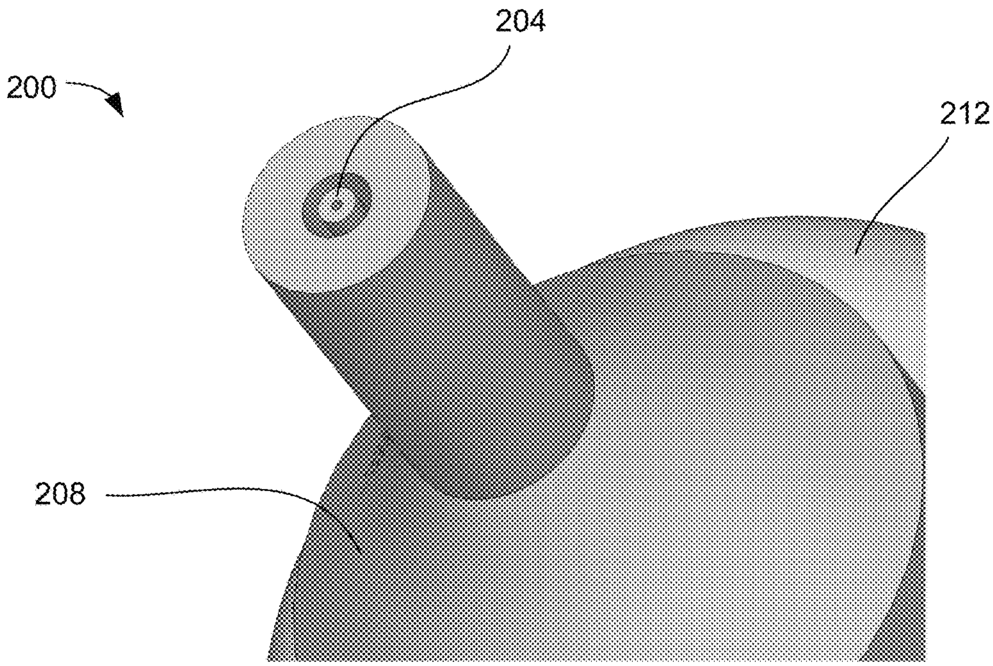

In operation of the embodiment 100, the second input port 118 may be employed for delivery of a predetermined substance such as a fluid to the target area through the second output port 126; in order to carry such delivery out, a judiciously structured infusion cannula may need to be inserted into the second input port 118. Accordingly, in at least one implementation of the embodiment of the invention, the device holder may be optionally complemented with such cannula adapter system, the different portions of the embodiment 200 of which are illustrated in FIGS. 2A, 2B, 2C.

Figure 2D:
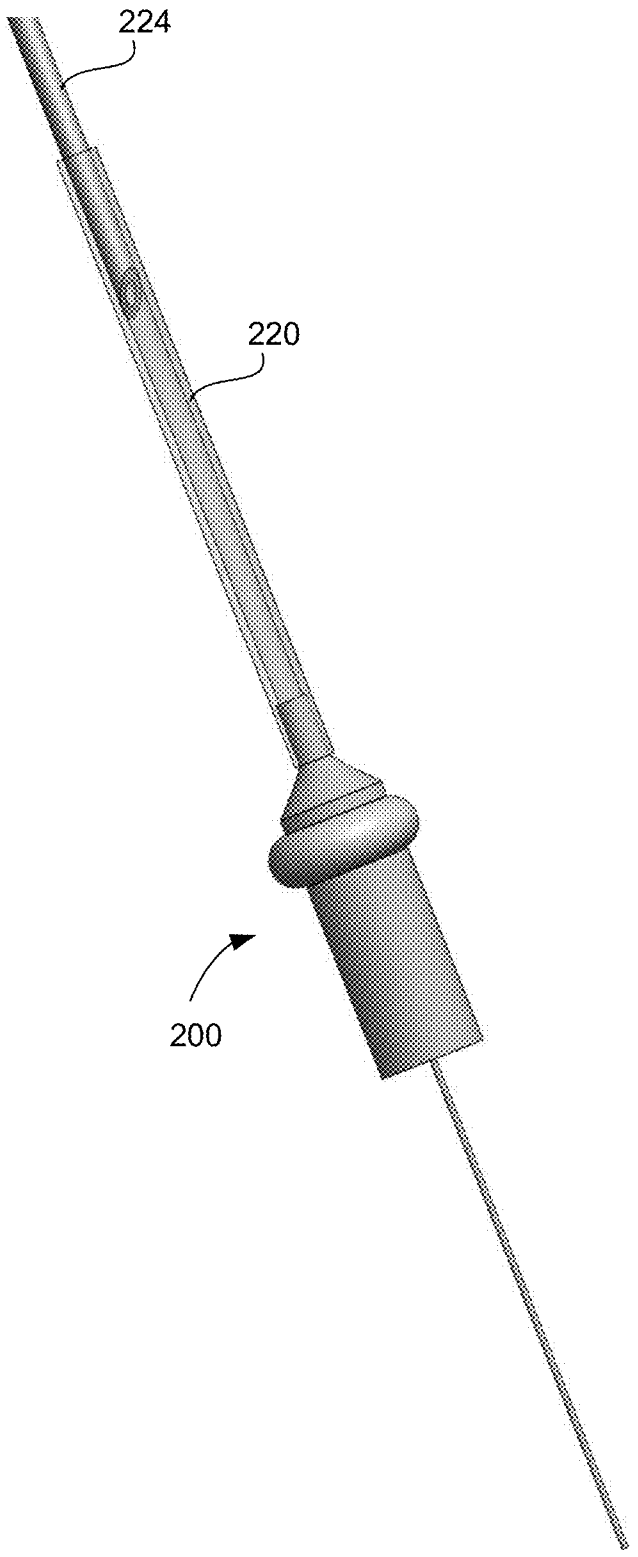

In one case, the embodiment 200 includes a flexible, polymicro-based cannula 204 of about 0.15 mm O.D. and about 0.04 mm I.D. that is attached to an adapter 208 (interchangeably referred to herein as "adapter head"). The adapter 208 is configured to enable not only the coupling of the infusion cannula 204 to the fluid delivery hollow connecting the second input port 118 with the second output port 126 but also securing the infusion cannula, when so coupled, within the fluid port 118 post-routing, for example with an O-ring 212 that fittingly holds the adapter 208 in place within or at the dedicated receiving portion of the hollow of the input port 118. The length of the infusion cannula 204 is such that the free end 204A of the infusion cannula 204 is substantially flush with the output end of the port 126 post routing and securement of the adapter within appropriate receiving portion. The fluid delivery line that can be fluidly coupled to the embodiment 200 is illustrated in FIG. 2D and may include polyethylene tubing 220 attached to a stainless-steel needle 224 of a syringe (not shown) that is mounted onto a syringe pump (not shown). (The use of syringe as the fluid reservoir and syringe pump for delivery allows quick and easy assessment of any fluid of interest. However, the adapter and polyethylene tubing can be attached to any fluid reservoir and pump for delivery.)

Accordingly, in use the fluid-like substance is delivered through the cannula 204 inserted into and through the ports 118, 126 (along the axis 118A, see arrow 304, FIGS. 3A, 3B), thereby avoiding and preventing contact between the inner surface of the tubular element of the second output port 126 with such fluid, which necessarily reduces the possibility of polluting the port 126 as well the need to clean/sterilize it. (The latter result-considering the intended operation of the port 126 after the embodiment 100 has been inserted and/or implanted into the target object such as a biological tissue-advantageously and substantially improves the health of the target tissue and lengthens the useful time of exploitation of the device holder 100 implanted into the target object.)

Figure 4A:
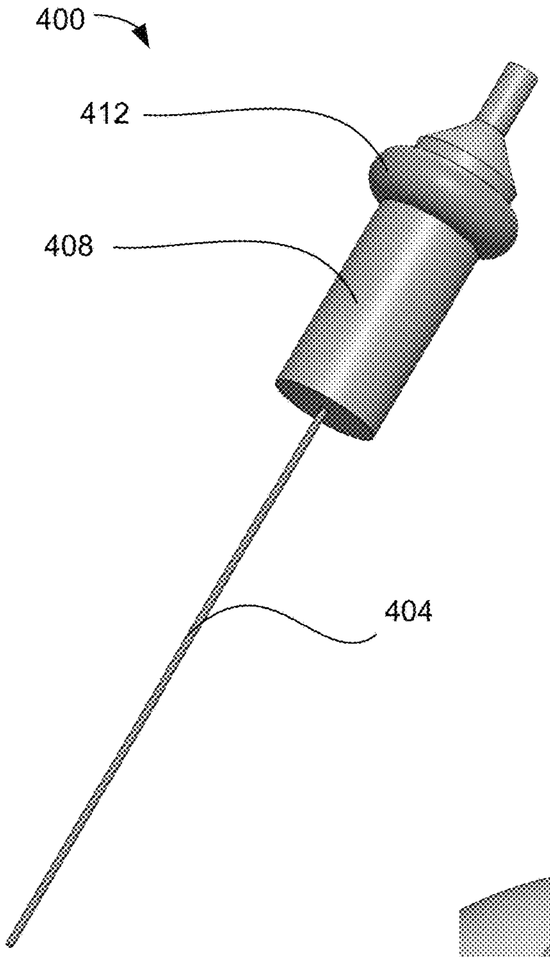
FIGS. 4A, 4B provide a schematic illustration of an embodiment of a solid-plug adapter component.
Figure 4B:
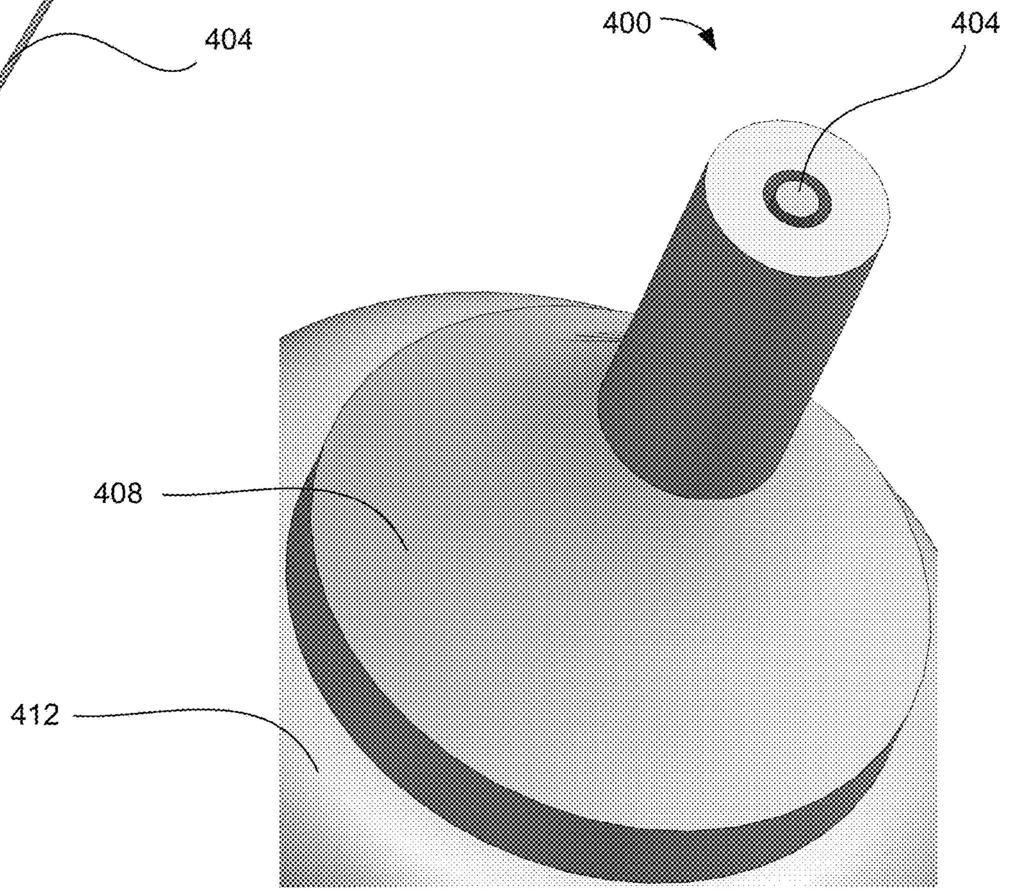

When there is no fluid composition being delivered with an infusion cannula routed through the ports 118, 126, the second input port 118 may be plugged with a flexible, about 0.18 mm O.D. solid stainless-steel wire affixed in an appropriate adapter-head 408 (which head may be substantially similar or even identical to the element 208, and equipped with an O-ring similar or substantially identical to the ring 212 of FIGS. 2A-2D)—see the embodiment 400 of FIGS. 4A, 4B. Such plugging is intended to prevent clogging of the second output port 126 during the process of the implantation of the embodiment 100 into the target object as well as for the entire duration of the implant. The solid-plug-adapter embodiment 400 secures the plug within the fluid port 118 post insertion. The length of the solid-plug (wire 404) is such that the end of the solid-plug wire 404 is flush with the free output end of the second output port 126 post routing and securement of adapter within the device holder 100.

Figure 5:
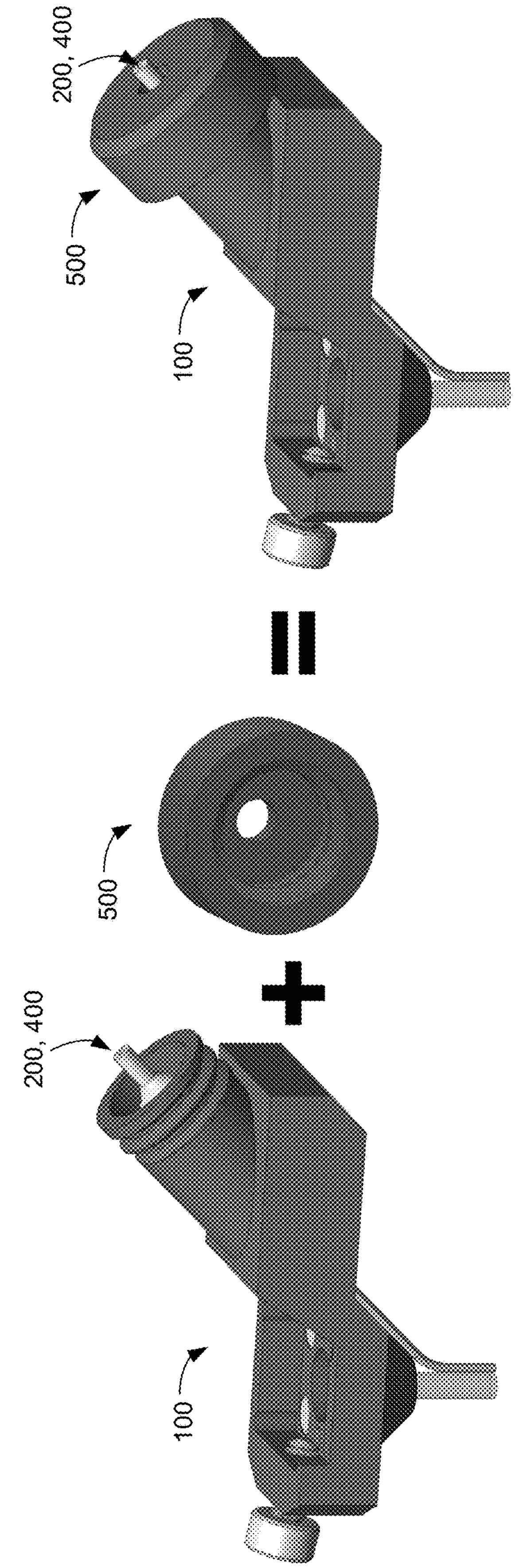
FIG. 5 illustrates an optional step of securing an embodiment of the infusion-cannular adapter component or an embodiment of the solid-plug adapter component that has been mated with an embodiment of the body of the device holder.

The structures of the adapter systems 200, 400 allow easy handling for insertion and removal thereof into the port 118 and through the port 118—into the port 126—when required. To further ensure that the adapter systems 200, 400 are held in place within the input port 118, an appropriately dimensioned (and optionally-threaded) cap 500 can be secured around the second input port 188 (the spout of the embodiment 100) as shown in FIG. 5.

Therefore, a skilled person now readily appreciates that an embodiment of an overall apparatus of the invention may include—in addition to the embodiment of the device holder—a fluid delivery device (such as the system 200) that contains a tubular channel (discussed above as cannula 204) dimensioned to be removably inserted into the second input port 126 and, upon translation along the second axis 118A, removably housed by and within the second output port 126. The tubular channel (in the example of FIGS. 2A-2D—cannula 204) may be dimensioned such that, when a proximal retaining element (for example, the O-ring 212) of the fluid delivery device is cooperated with the second input port to affix the fluid delivery device therein and/or temporarily immobilize the fluid delivery device therein, an output aperture of the tubular channel (cannula 204) is either not inside the tubular structure of the second output port 126 or is substantially flush with an output aperture of the tubular structure of the second output port 126.

Alternatively or in addition, an embodiment of the overall apparatus of the invention may include, besides the device holder, a plug device (such as the embodiment 400) that contains a flexible rod of material (wire 404, in the case of FIGS. 4A, 4B) dimensioned to be removably inserted into the second input port 126 and, upon translation along the second axis 118A, removably housed by and within the second output port 126. Such embodiment additionally includes a head of the plug device (408, 412 in FIGS. 4A, 4B) supporting a proximal end of the flexible rod of material with which, which the head of the plug device is cooperated. The head of the plug device is dimensioned to fittingly close a hollow of the second input port 118 when the flexible rod of material is removably inserted therethrough and into the tubular element of the second output port 126.

Figure 6A:
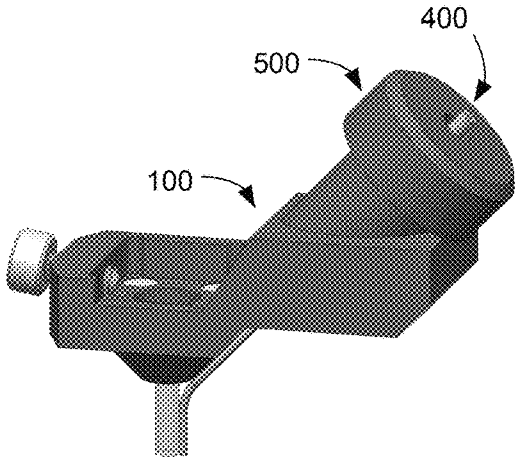
FIGS. 6A, 6B, 6C, 6D, 6E, and 6F schematically illustrate at least a portion of the process of use of an embodiment of the device holder.
Figure 6B:
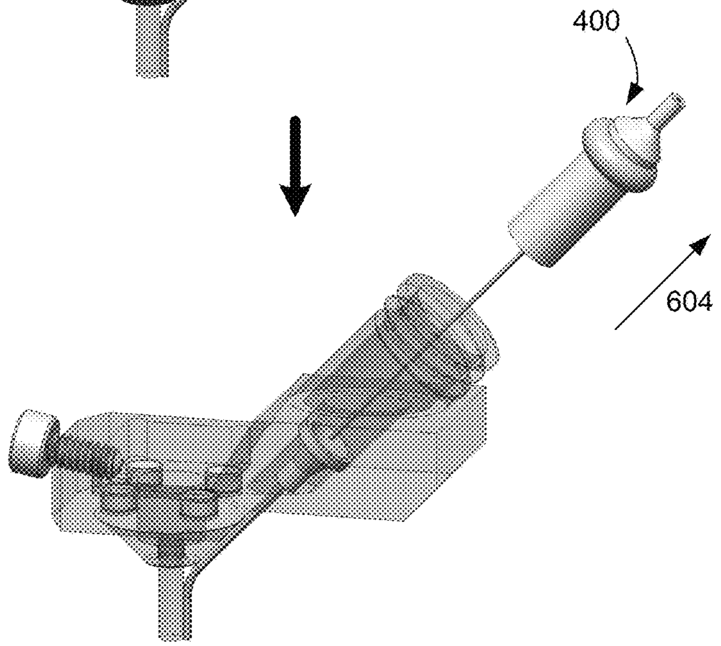
Figure 6C:
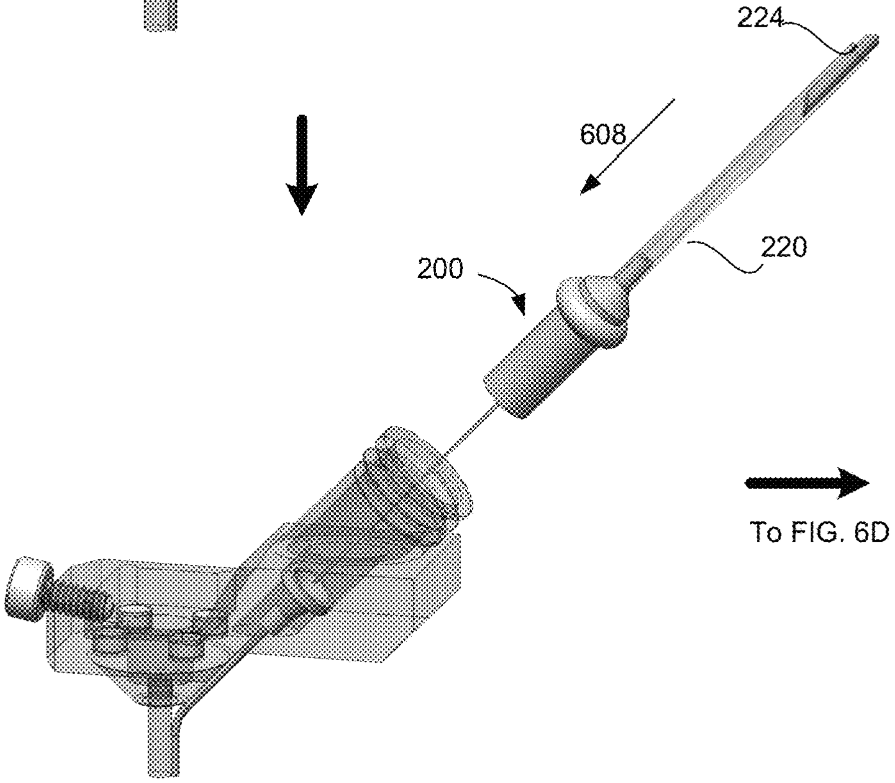
Figure 6D:
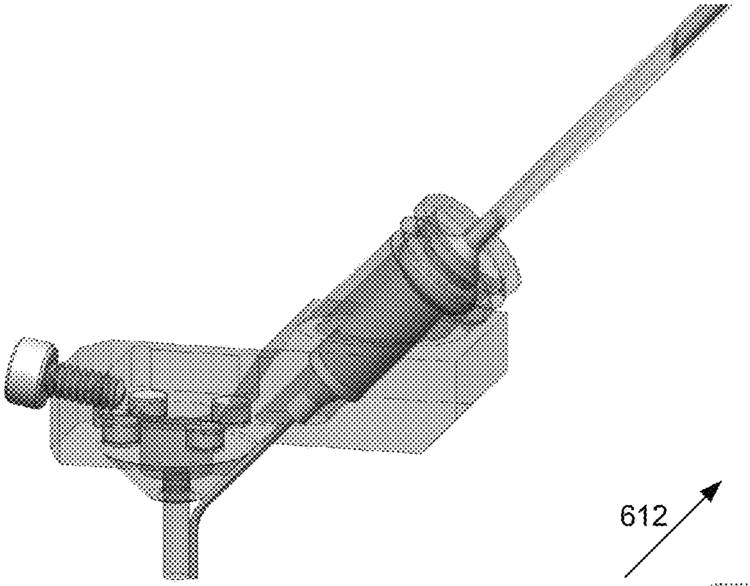
Figure 6E:
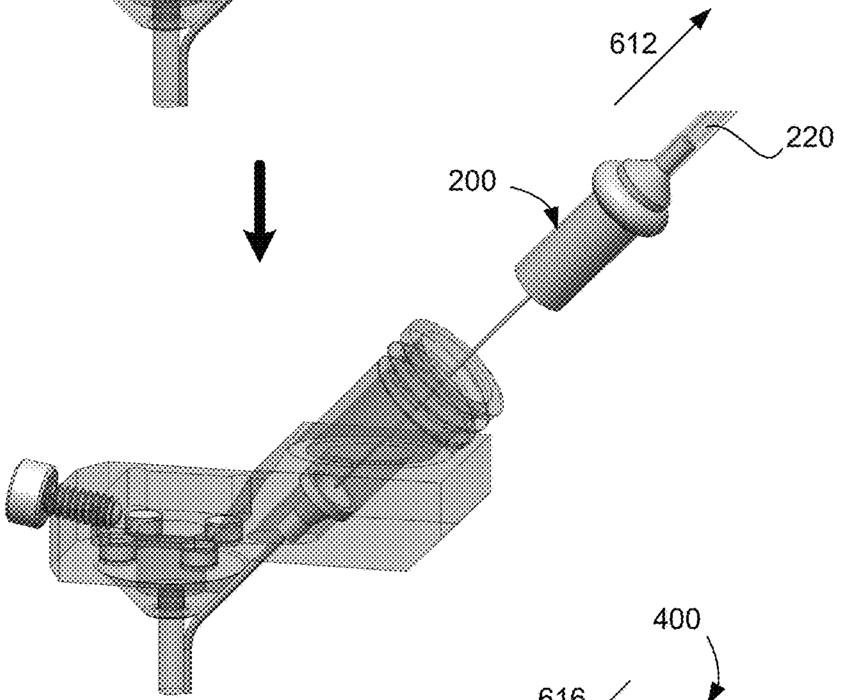
Figure 6F:
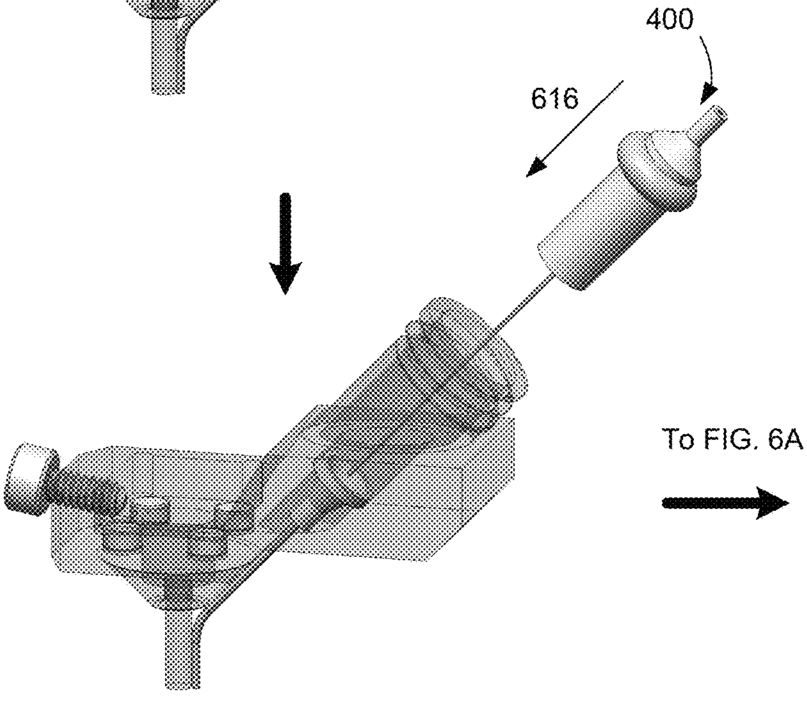

FIGS. 6A, 6B, 6C, 6D, 6E, and 6F schematically illustrate one embodiment of a workflow of the use of an embodiment of the invention (which, in at least one case, has been already installed into the target object and/or implanted in it). Starting with the situation when the second input port 118 of the device holder 100 houses the solid-plug adapter 400, which is optionally capped, the threaded cap 500 is first removed to expose the solid-plug-adapter 400; FIGS. 6A, 6B. The solid-plug-adapter 400 is then pulled (arrow 604, FIG. 6B) out and an infusion cannula pre-attached to a fluid delivery line (200, 220, 224) is inserted into the second input port 118; arrow 608, FIGS. 6C, 6D. Once fluid substance is delivered as intended, the infusion cannula is removed (arrow 612, FIG. 6E) and a fresh solid plug-adapter 400 is re-inserted into the second port 118 and the cap 500 is threaded back in place; FIG. 6F. This process may be repeated during each infusion.

FIG. 7 schematically illustrates an embodiment of the device holder of the invention with an Inscopix interrogator apparatus 710 (such as any of miniature imaging devices, discussed for example in US 2022/0104907 or US 2022/0387127, the disclosure of each of which is incorporated by reference herein) docked into the guiding structure of the first input port 114 of the device holder and infusion-cannula-adapter connected to a delivery line (200, 220, 224) operably cooperated with the second input port 118 for simultaneous imaging/sensing of the target area through the first output port 122 and fluid substance delivery to the target area through the second output port 126. (In one specific case, such setup may be used for simultaneous fluid delivery and calcium imaging/optogenetics with the docked Inscopix miniscope at brain location of interest, for example.)

In a related implementation, the embodiment of the device holder such as embodiment 100 may be employed to support a system is configured as an electrophysiology-scope for substantially simultaneously performing electrophysiology, calcium imaging, as well as optogenetic stimulation at the very same location of a biological tissue—for example, a brain—for a variety of neurophysiological applications (for example, in freely behaving rodents). Such systems can allow for less than millisecond accuracy and precision in time synchronization between multiple data streams, thereby allowing seamless integration and free animal behavior. To this end, FIG. 8 illustrates a portion of an embodiment 800 of the interrogator configured as an electrophysiology scope and/or a microscope with on-board electronics. Here, the electrophysiology connector 810 and electrophysiology flex circuit 820 may be structured to relay the electrical (for example—voltage) signals from the recording electrode array to the ‘scope board’ 830, which houses the processor. Depending on the specifics of a particular implementation, a multi-channel electrophysiology connector (such as, for example, a 16-channel or a 32-channel electrophysiology connector produced by Omnetics Corporation) can be employed to establish electrical connection(s) with an electrode array of first output port of the device holder configured as an ME-lens. The scope board 830 may be additionally configured to acquire imaging data (for example, calcium video data) from the image sensor (optical detector) electronic circuitry 840. The drive signals for the light sources such as LEDs housed within the interrogator 800 and the lens of the first output port (when such lens is, for example, electronically tunable) can be transferred from the scope board 830 via respectively-corresponding respective portions of electronic circuitry 850. The electrophysiology data and/or video data may be carried over to the integrated commutator or integrated data acquisition system (not shown; optionally—external to the interrogator 800) via the scope cable 860.

Notably, an electrophysiology-scope may include any or all of an electrophysiology connector, an electrophysiology flex or rigid or rigid-flex circuit, a scope board (rigid or flex or rigid-flex), an image sensor, image sensor flex or rigid or rigid-flex circuit, EX-LED source, OG-LED source, an embodiment of a lens, flex or rigid or rigid-flex circuits for driving LEDs and the lens, or any combination thereof. In some specific implementation, an electrophysiology connector on the electrophysiology-scope may be in contact with the mating connector on a lens assembly module or interface using a connector-adapter. In at least one implementation, a first output port 122 of the device holder 100 may be configured to include a multi-electrode lens (ME-lens) probe (discussed in more detail below, in reference to FIGS. 9, 10, 11, 12, 13), for use with an electrophysiology-scope. The ME-Lens probe can be fitted in a ME-lens assembly module and connected with the electrophysiology-scope using a mating connector. The ME-lens probe can be fitted in a ME-lens assembly module and connected with the electrophysiology scope using a connector-adapter. A scope cable may be used to transfer one or more data streams (e.g., calcium imaging data, electrophysiology data) from one or more parts of the interrogator to a commutator or a data acquisition system (for example, a first stream may be transmitted, followed by a second stream through a single line, according to a chosen protocol of data transfer).

Figure 9:
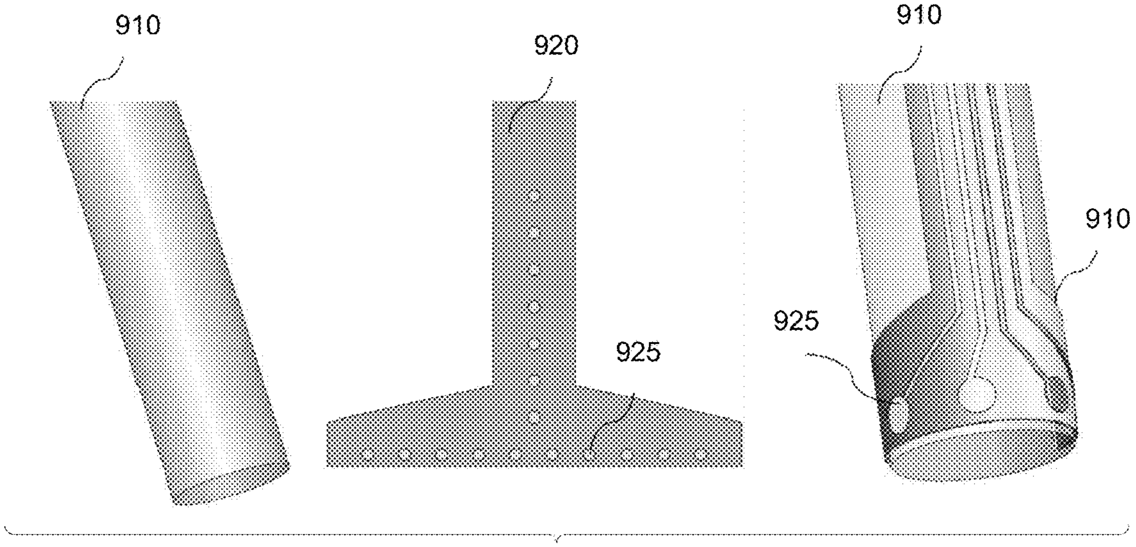
FIG. 9, containing a three sub-set drawing, illustrates components of and the assembled embodiment an implantable "multi-electrode integrated lens" (ME-lens) dimensioned for use as a first output port of an embodiment of the invention dimensioned as a rod-like GRIN lens and configured for simultaneously or temporally-independently carried out processes of electrophysiology, calcium imaging, and optogenetics at the same internal area of the target object of interest.

FIG. 9 shows schematically an example of portions of an ME-lens probe structured for use as a second output port 122 of the device holder 100; such probe includes a GRIN lens 910 and a thin-film electrode array 920 (which includes at least one—and, preferably, a plurality—of electrode sites 925 bonded to the GRIN lens 910).

Figure 10:
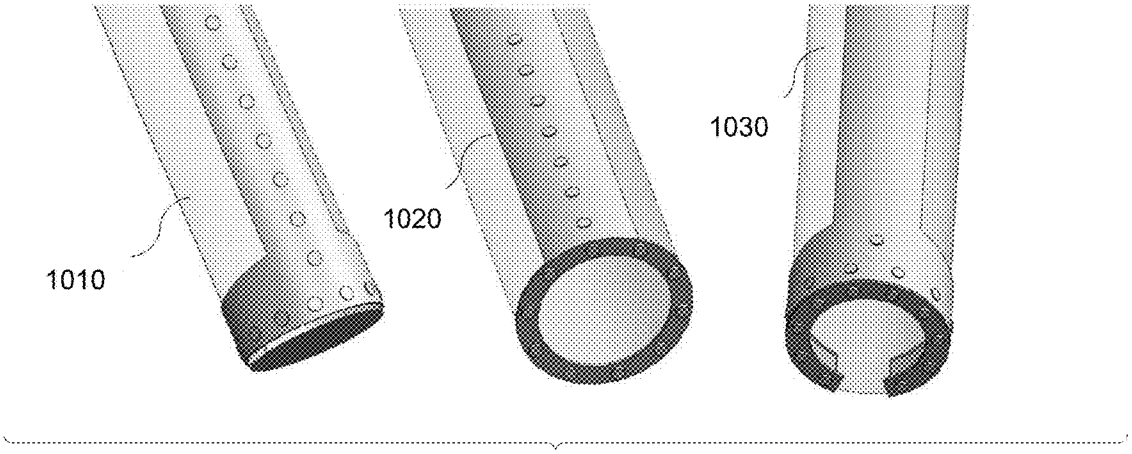
FIG. 10 includes a three sub-set drawing that illustrates related implementations of the first output port of the device holder, each of which carries a corresponding substantially optically opaque electrode coating.
Figure 11:
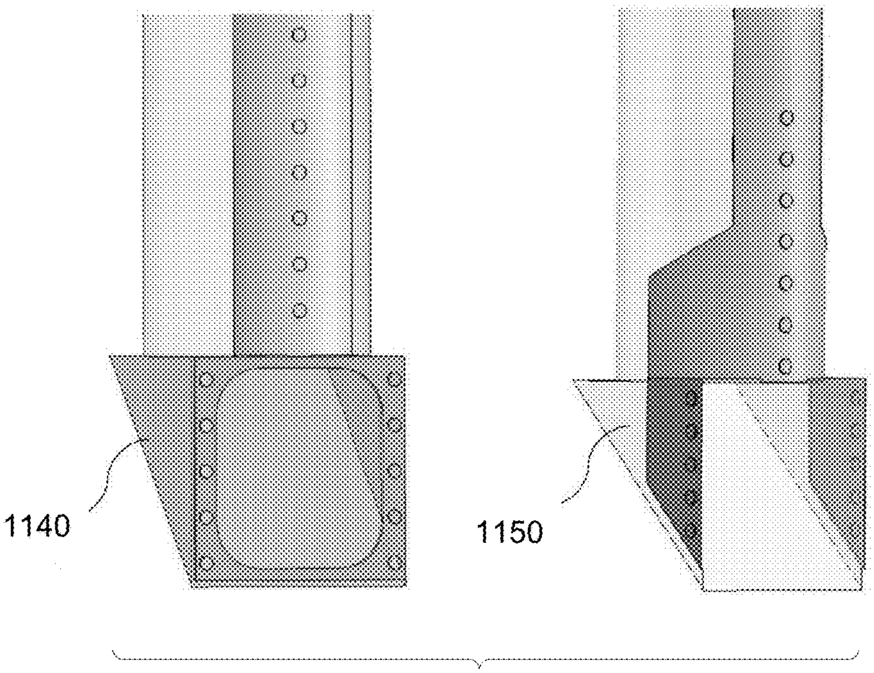
FIG. 11, containing a two sub-set drawing, depicts examples of related spatial arrangement of substantially optically opaque electrode coatings on a first output port of the device holder configured as a lens terminated with an optical prism.
Figure 12:
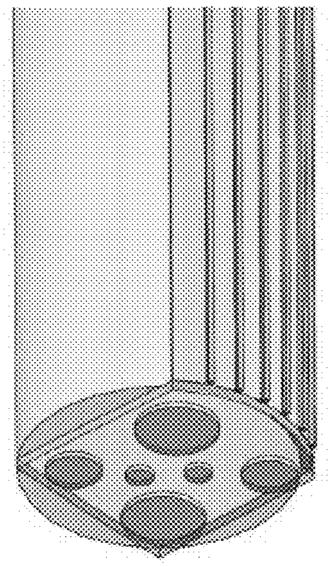
FIG. 12 shows an embodiment of an ME-lens configured as a rod-like GRIN lens (optically complemented with a plane-parallel optical plate shown attached to the output surface of the GRIN lens) and an array of electrodes disposed on the side surface of the GRIN lens and either on the output facet of the lens or on the plane-parallel plate (when present).
Figure 13:
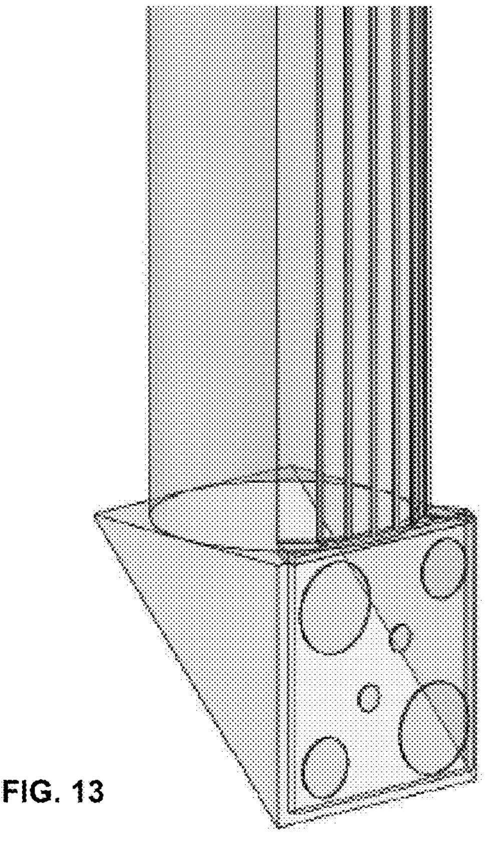
FIG. 13 schematically depicts an embodiment of the first output port of the device holder of the invention, dimensioned as a rod-like lens terminated with an optical prism and configured as an ME-lens.
Figure 14:
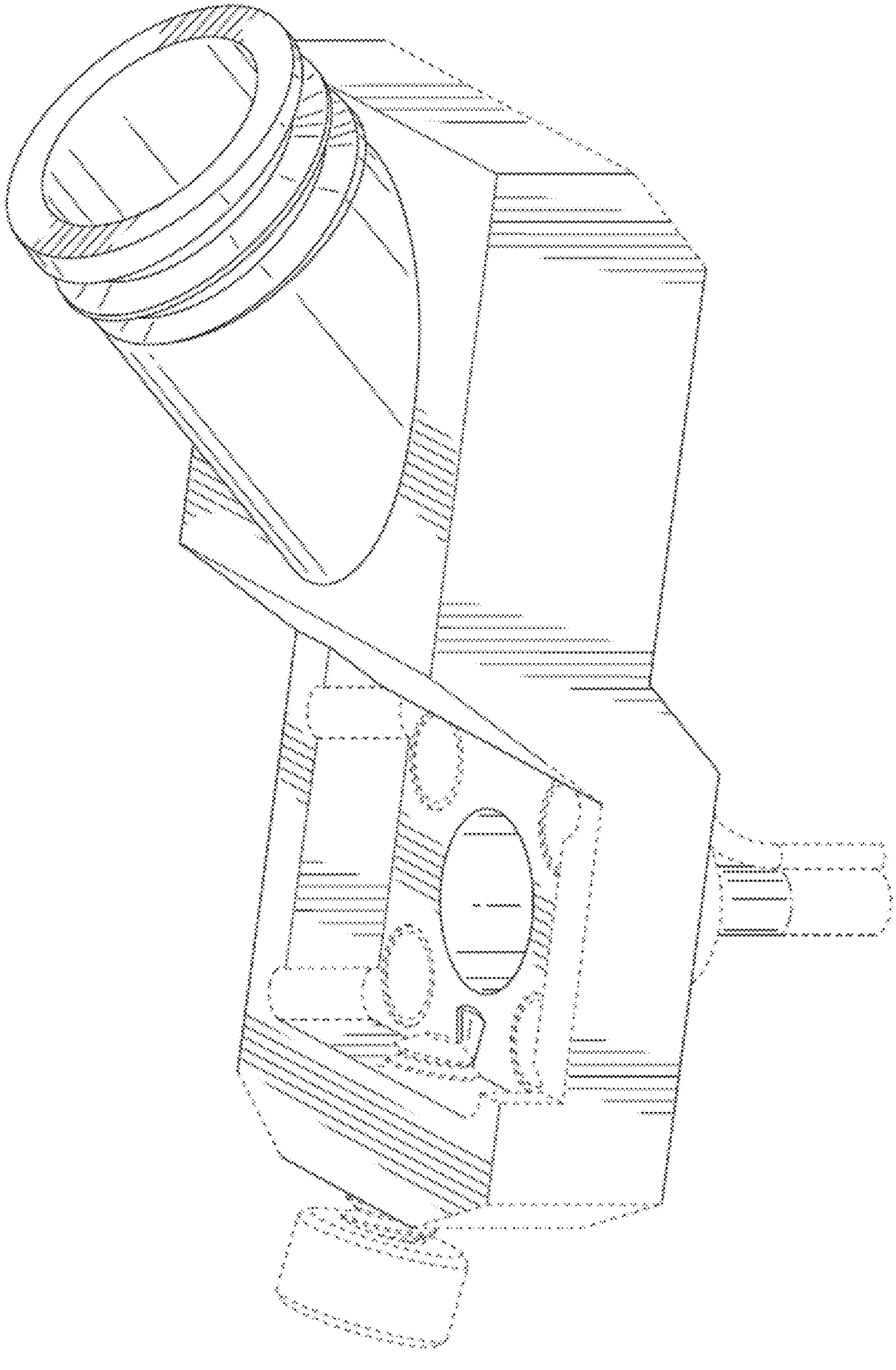
FIGS. 14, 15, 16, 17, 18, 19, 20, 21, and 22 provide different views of a related embodiment of the invention and illustrate optional structural features in dashed lines.
Figure 15:
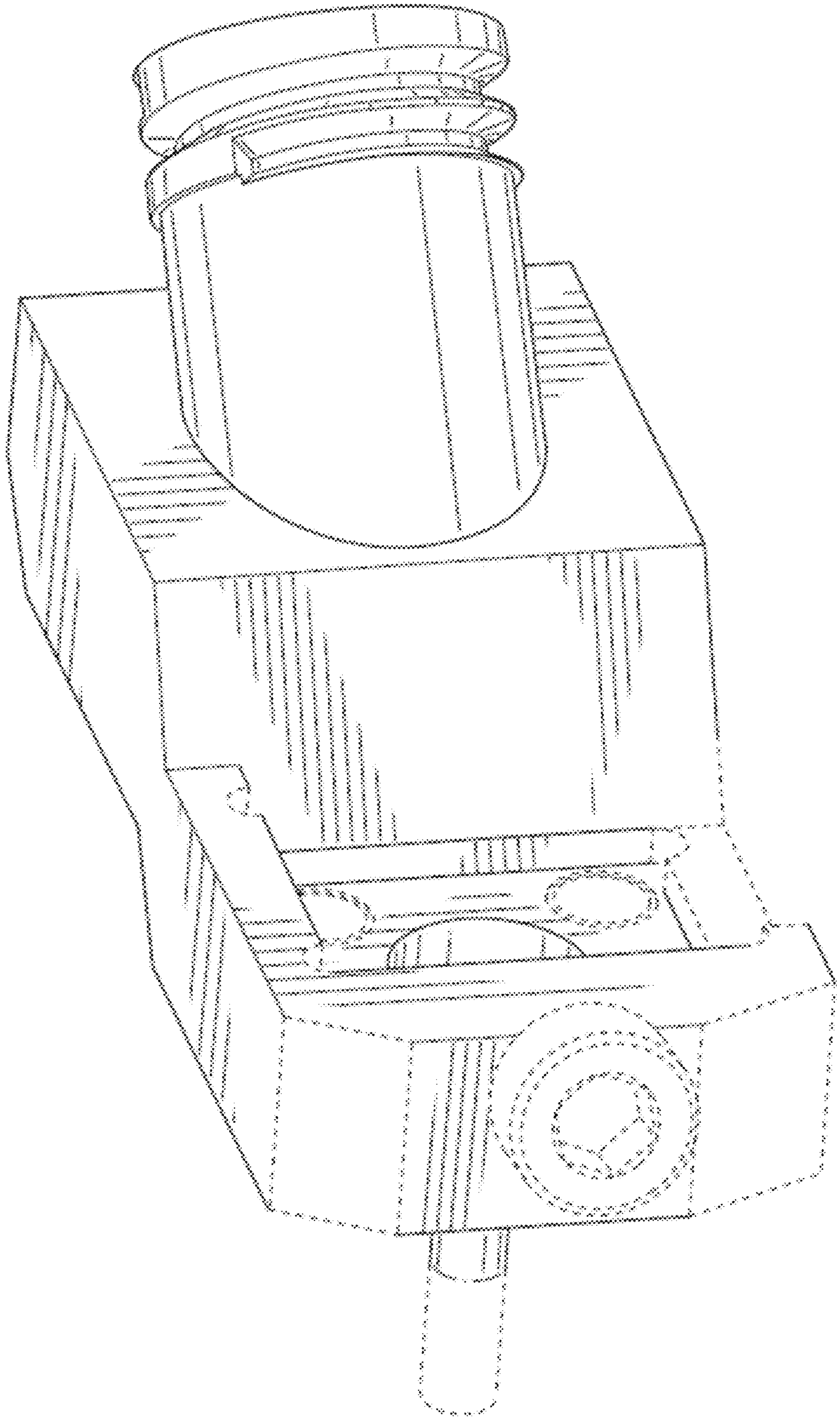
Figure 16:
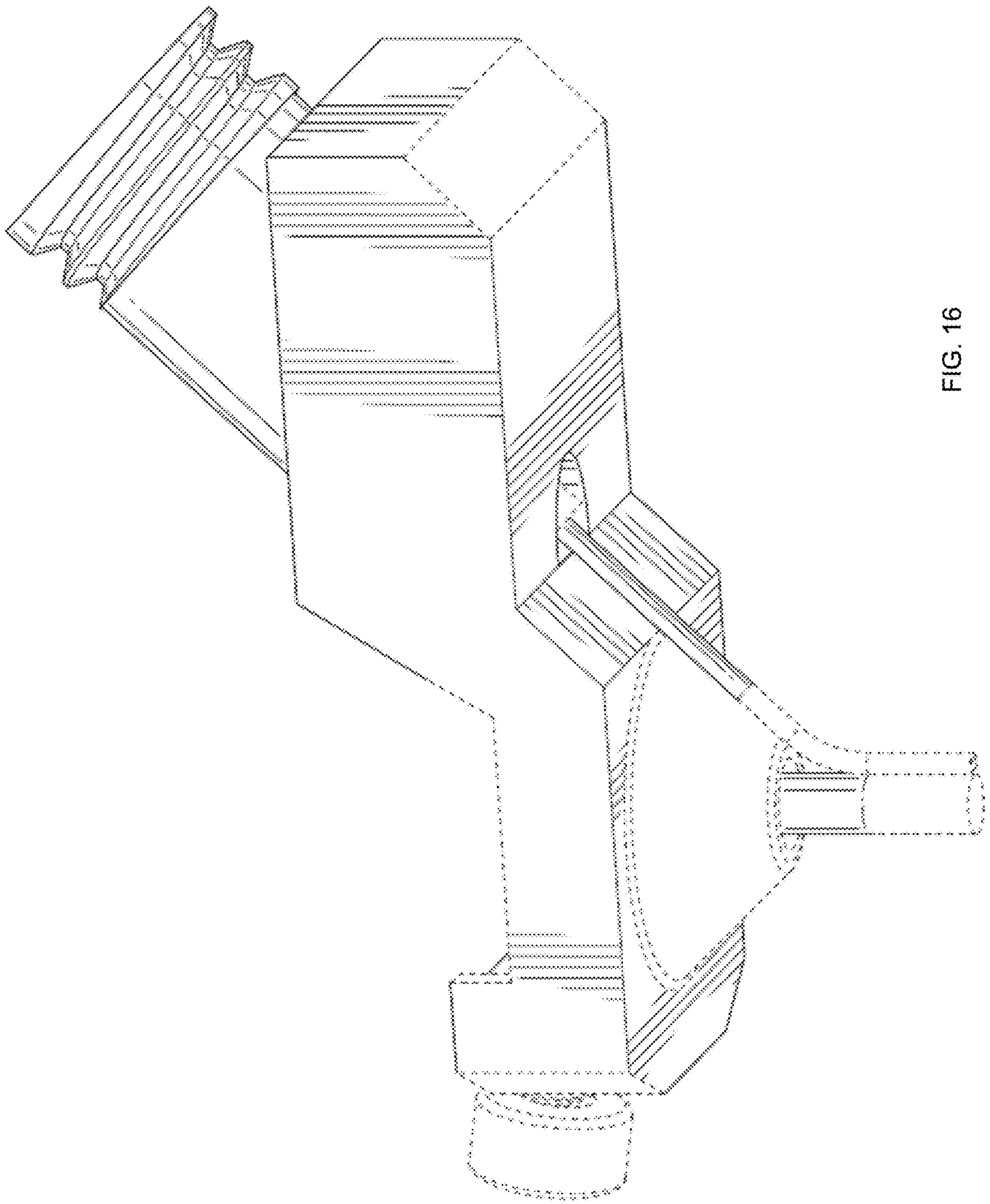
Figure 17:
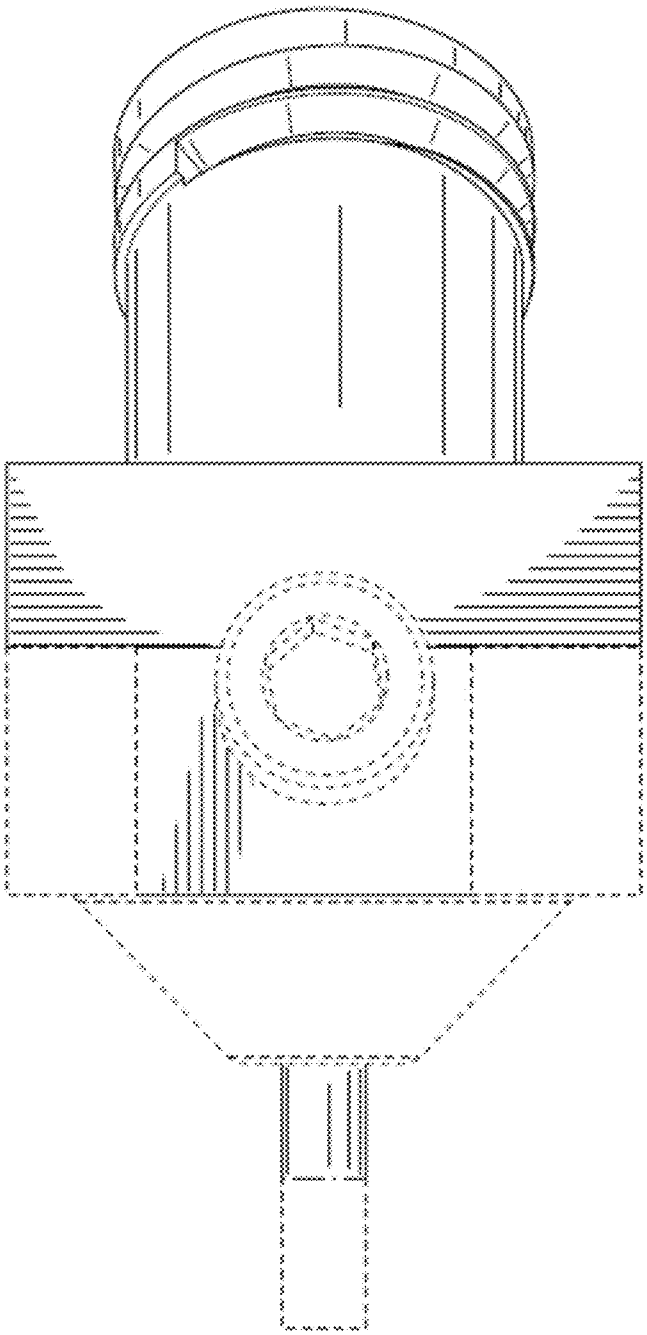
Figure 18:
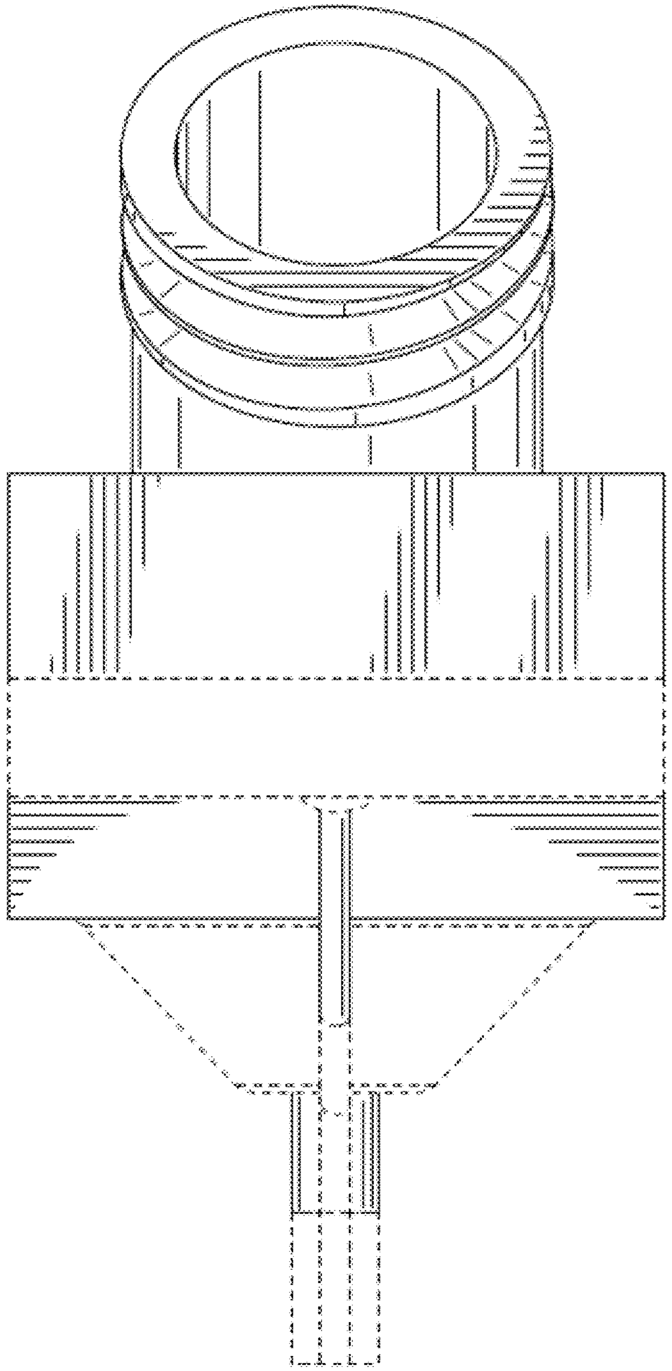
Figure 19:
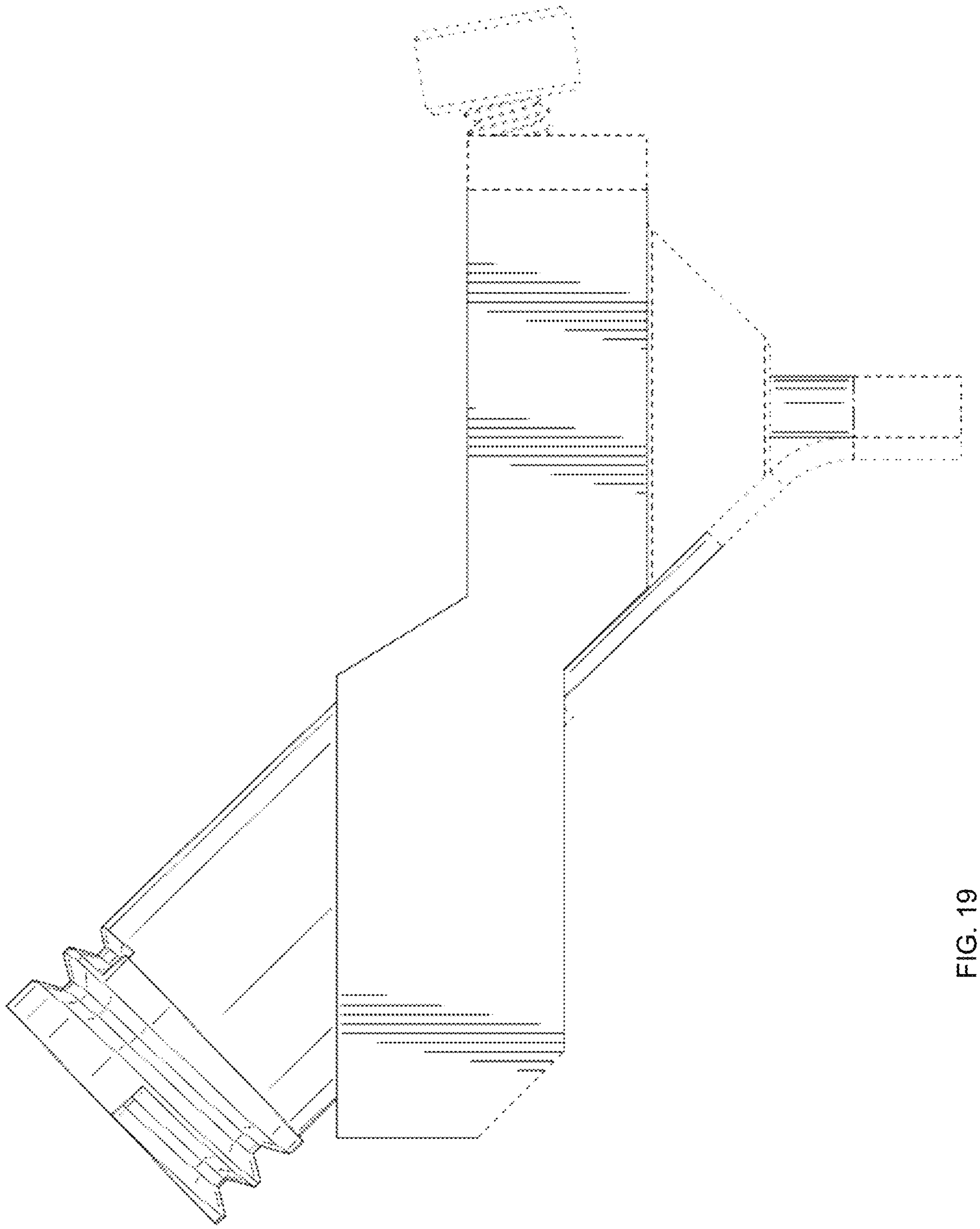
Figure 20:
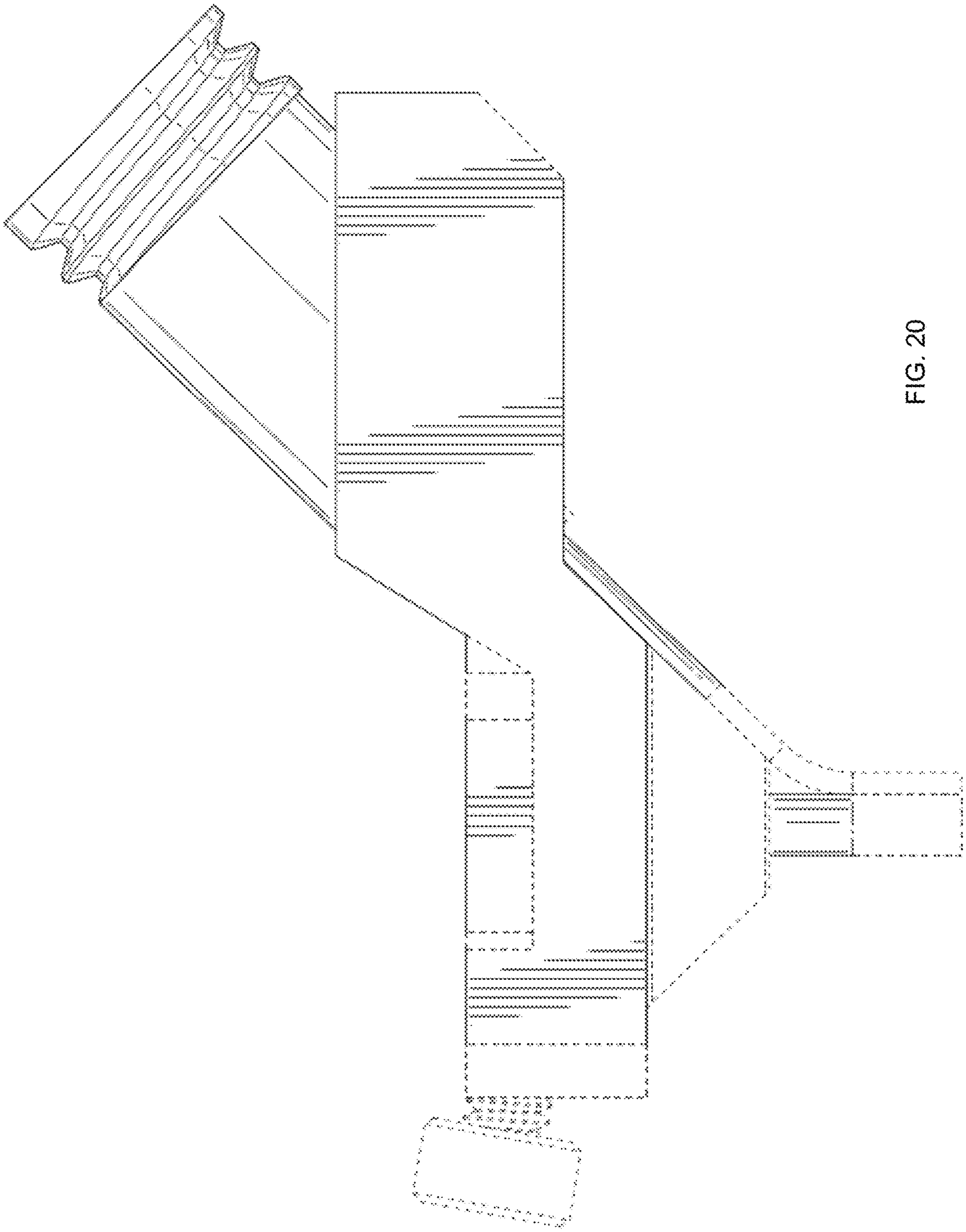
Figure 21:
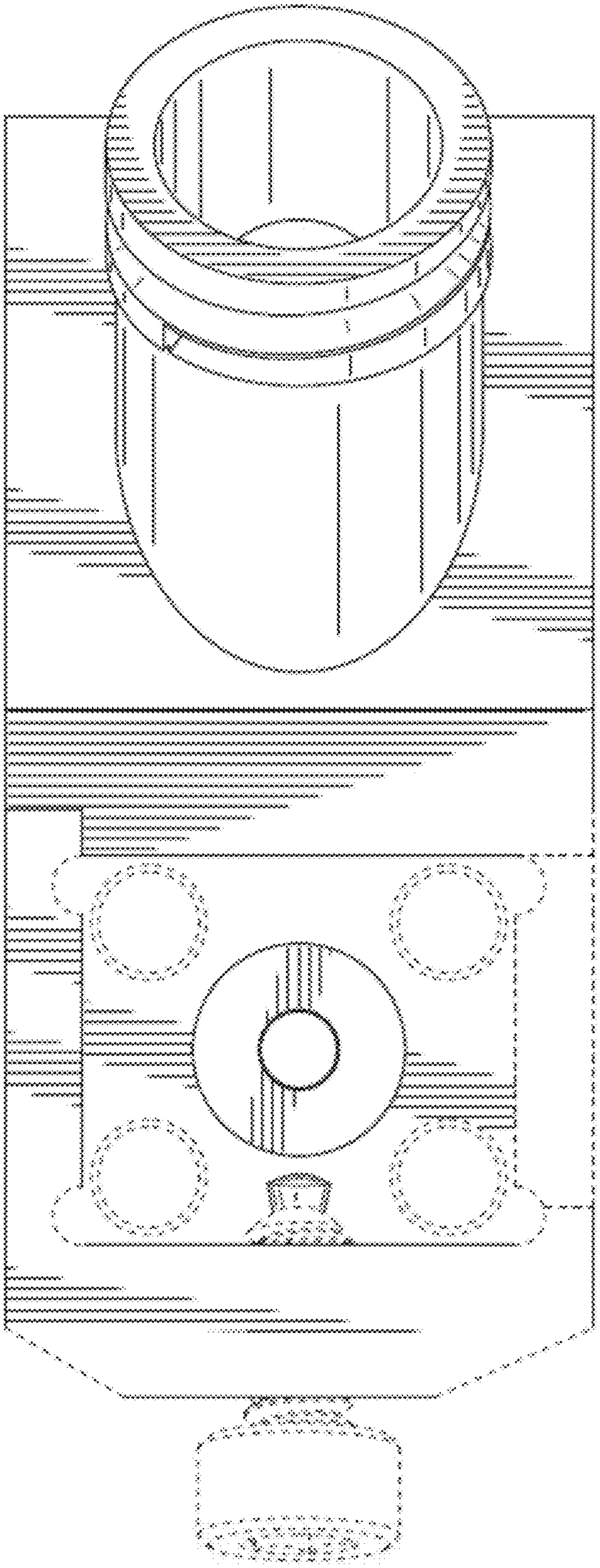
Figure 22:
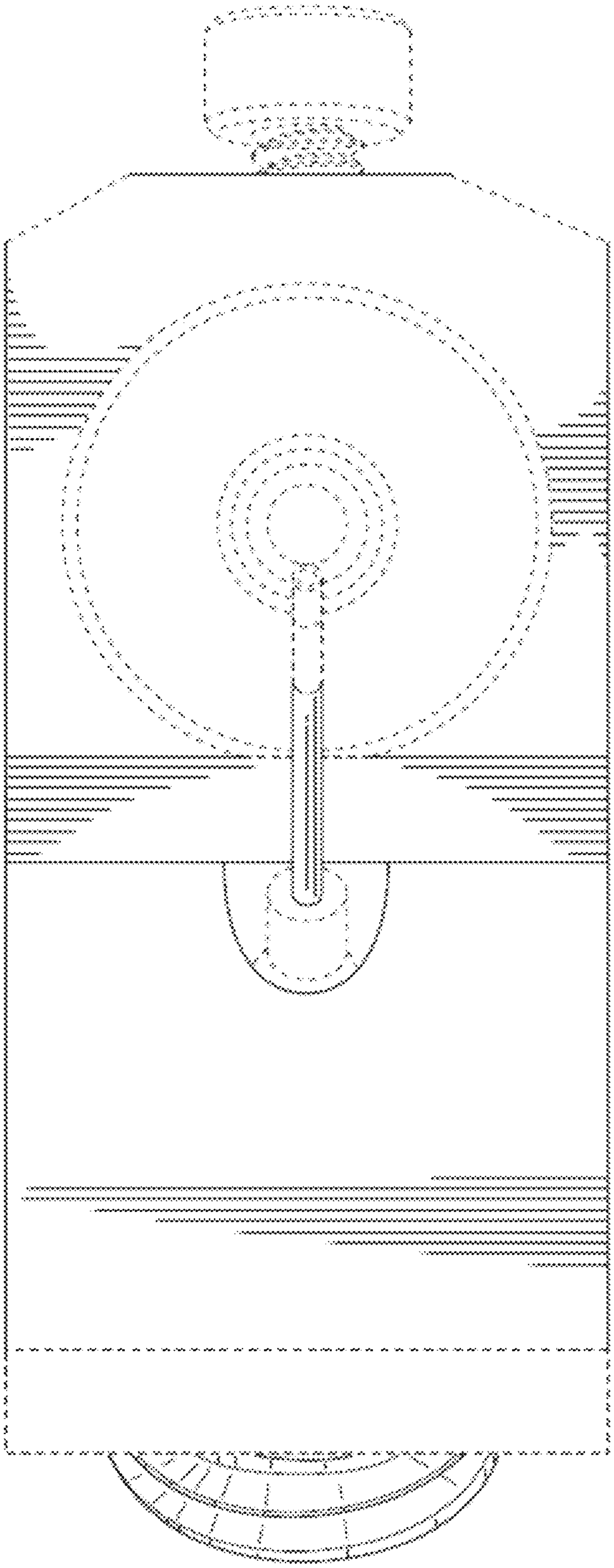

FIG. 10 provides three examples of different optically non-transparent electrode arrays on a straight GRIN lens, where electrode sites can be near the imaging face and along the length of the probe 1010, electrode sites can be on the imaging facet and/or along the length of the GRIN lens of the probe 1020, and where the electrode sites can be on and near the imaging facet of the GRIN lens of the probe 1030. FIG. 11 provide examples of different optically non-transparent arrays cooperated with a GRIN lens the output facet of which is complemented with an optical prism: here, the electrode sites can arranged on the imaging facet of the optical prism and/or along the length of the GRIN lens of the probe 1140, or near but not on the imaging facet of the optical prism and/or along the length of the GRIN lens of the probe 1150. FIG. 12 shows an example of a transparent electrode array on a straight (side surface) GRIN lens portion of the probe and of an optically-transparent electrode array on an optically-transparent plate placed substantially parallel to the output facet of the GRIN lens, while FIG. 13 shows an example of an optically transparent electrode array on an output surface of the optical prism cooperated with the GRIN lens. The ME-lens—just like any other form of a lens configured for use as a second output port 122 of the device holder 100—may contain additional thin-film coating(s) thereon, and be dimensioned to have a diameter from about 0.001 mm to about 5 mm, a numerical aperture (NA) of at least about 0.001, 0.01, 0.1, 0.2, 0.3, 0.4, 0.5, 0.6, 0.7, 0.8, or 0.85, depending on the specifics of a particular implementation. In a specific case when the lens-based probe includes at least one flat surface, such surface may be tilted with respect to an axis of the lens (by, for example, at least 15°, 30°, 45°, 60°, 75°, 90°, or even more. The lens-based probe may be characterized by a refraction gradient that has spherical, axial, and/or radial distributions and—optionally—be optically aligned to an optical fiber and/or produce a collimated light. The array of electrodes may be configured on a flexible electrode substrate possessing pre-defined Young's modulus (stiffness), flexural modulus, tensile strength, percent elongation at break, temperature stability, chemical resistance, and biocompatibility, and be organized with one or more faces, or a curved surface, of the lens/optical probe, as indicated above, via physical adhesion or chemical adhesion, mechanical interlocking, electron transfer, boundary layers and interfaces, adsorption, diffusion, chemical bonding, and/or coating as known in related art. Generally, the electrodes may comprise stainless steel, silver, nickel, copper, gold, titanium, platinum, graphite, a conductive polymer, an organic material, or any combination thereof.

FIGS. 14, 15, 16, 17, 18, 19, 20, 21, and 22 schematically illustrate different views of a related implementation 1400 of the invention, in which some structural features that are optional—as compared with those discussed in reference to FIGS. 1A, 1B, 1C—are indicated in dashed lines.

Overall, as will be now readily understood by a skilled artisan, this application addresses a structure to be used with (and a corresponding method) a miniaturized device configured to be substantially permanently affixed to and partially inside of a target object (and intended to remain affixed to such object substantially irremovably and in an unchanged orientation with respect to such object substantially indefinitely—or, at least on a time-scale comparable to the term of life or use of the target object itself) to provide repeatable, chronic access to an internal area and/or volume of the target object from a location outside of the target object and the miniaturized device, as well as communication between such internal area/volume and the location outside of the target device along multiple communication channels that are spatially separate and substantially immovable with respect to one another while remaining moveable together and synchronously with the object. The employed methodology employs the single—the only—process of implantation, into the target object, of a portion of an embodiment of the device that contains both the channel configured to propagate the electromagnetic energy and the channel configured to propagate the material stimulus such these first and second channels necessarily maintain unchanged mutual spatial positioning and orientation regardless of whether the channels are being used or not and regardless of whether the target object—together with these channels—is spatially repositioned.

Embodiments of invention are configured such that the use of a fluid ports (the second input port and the second output port) allow for repeated insertion and removal of infusion cannulas as needed. Such configuration is advantageous in stark contradistinction with the structures of related art, in particular over a single-implanted-fluid-delivery-cannula approach in that 1) testing effects of different drugs/fluids delivered at the same site over several weeks using different infusion cannulas paired with fluid delivery lines is now seamlessly enabled, and 2) implanted fluid port (the second output port of the embodiment as discussed) would not and does not directly encounter any fluids, thereby minimizing chances of infection/clogging which is especially critical for testing in non-human primates.

Some key use-cases of the proposed structure include: 1) delivering viruses expressing sensors directly to the site of calcium imaging/optogenetics, which is a great improvement over the current state-of-the-art of (a) two independent surgeries over a period of several weeks for viral infection and lens implantation at the same target location and (b) securing viruses at the end of implantable lenses using biomaterials which suffer from loss of some viral material due to wash-off during implantation, 2) delivering multiple viruses that express different transgenes and/or target different cell populations at the site of imaging/optogenetics at different time points, thereby eliminating the current requirement of delivering viruses together at the same time in order to reduce the total number of surgeries which in turn results in viral competition issues, 3) delivering dyes, labels, drugs that do not/poorly cross the blood-brain-barrier, but whose impact on the brain is of great interest for development of novel therapies. This port allows local delivery of compounds, as opposed to systemic delivery. Systemic delivery of compounds makes interpretation of compound effects challenging due to global impact on the brain and other systems in the body. Further, localized delivery of drugs at the site of imaging/optogenetics with miniscopes will provide insights into effects of drugs on local neural circuit activity as well as animal behavior, thereby enabling the study of both local and global effects simultaneously. Finally, the port on this device provides access to the imaging/optogenetics site post implantation and can also be used for routing other flexible devices such as optogenetic fibers, brain biopsy needles, electrodes, microdialysis probes etc. to the target site.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

A person of ordinary skill in the art will readily appreciate that references throughout this specification to "one embodiment," "an embodiment," "a related embodiment," or similar language mean that a particular feature, structure, or characteristic described in connection with the referred to "embodiment" is included in at least one of the discussed embodiments. Thus, appearances of the phrases "in one embodiment", "in an embodiment", and similar language throughout this specification may, but do not necessarily, all refer to the same embodiment. Accordingly—as the skilled artisan will readily appreciate—while in this specification the embodiments have been described in a way that enables a clear and concise specification to be written, it is intended that substantially none of the described embodiments can be employed only by itself to the exclusion of other embodiments (to the effect of practically restriction of some embodiments at the expense of other embodiments), and that substantially any of the described embodiments may be variously combined or separated to form different embodiments without parting from the scope intended for protection.

For the purposes of this disclosure and the appended claims, the expression of the type "element A and/or element B" is defined to have the meaning that covers embodiments having element A alone, element B alone, or elements A and B taken together and, as such, is intended to be equivalent to "at least one of element A and element B".

Disclosed aspects, or portions of these aspects, may be combined in ways not listed above. Accordingly, implementations of the discussed idea should not be viewed as being limited to the disclosed embodiment(s). While the invention is described through the above-described examples of embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

The invention claimed is:

1. A system comprising:

a hand-held device holder that includes:
- a holder body having an outer surface,
- a first input port having a first axis, at least two connectors that are disposed at a surface transverse to the first axis and that are configured to removably affix an external interrogator apparatus therewith, and a first input port aperture in said surface, and
- a second input port having a second axis transverse to the first axis and containing a substantially cylindrical hollow along said second axis,
- a first output port containing an optical element protruding along the first axis outside the outer surface of the device holder and substantially inseparably and/or permanently cooperated with the first input port at said first input port aperture in optical communication with said first input port aperture, and
- a second output port dimensioned as a tubular structure protruding along the second axis outside the outer surface and fluidly and substantially inseparably cooperated with the second input port such that a first portion of the tubular structure is substantially co-axial with said cylindrical hollow of the second input port.

2. A system according to claim 1, wherein the first and second axes are not perpendicular to one another.

3. A system according to claim 1, wherein a combination of a distal end of the first output port and a distal end of the tubular structure of the second output port is configured such as to substantially prevent a relative movement therebetween and/or between a chosen distal end of the combination and the holder body, thereby defining said combination as rigid construction that is substantially immovable with respect to the outer surface.

4. A system according to claim 1, wherein the first input port includes a guiding structure dimensioned to accept a housing of the external interrogator apparatus configured as a microscope therein upon repositioning of the housing along the first axis while substantially preventing the housing from being translated laterally with respect to the first axis.

5. A system according to claim 4, wherein said guiding structure is dimensioned as a closed wall substantially parallel to the first axis.

6. A system according to claim 1, wherein the second input port includes a funnel surface substantially co-axial with the second axis.

7. A system according to claim 1,
- wherein the first output port is substantially symmetric about the first axis, and/or
- wherein the optical element of the first output port is a substantially cylindrical solid element made of an optically transparent material, and/or
- wherein the first output port includes an optical prism, and/or
- wherein an output surface of the first output port is transverse to the first axis.

8. A system according to claim 7, wherein:
(8A) the first output port is completely defined by said optical element protruding along the first axis outside the outer surface of the device holder;
and/or
(8B) wherein an outer surface of the first output port carries thereon a first thin-film coating configured as a set of electrically-conducting members including one or more of said electrically-conducting members, and/or wherein the output surface of the first output port carries therein a second thin-film coating electrically connected with the first thin-film coating, and/or wherein at least one of the first and second thin-film coatings is substantially optically opaque.

9. A system according to claim 1,
wherein the second output port includes a metallic pipe or capillary, and/or
wherein a distal end of the tubular structure of the second output port has a third axis that is substantially parallel to the first axis, and/or
wherein an output edge of the distal end of the tubular structure is in a surface that is substantially flush with an output surface of the distal end of the first output port.

10. A system according to claim 1,
wherein the at least two connectors include magnets cooperated at said surface, and/or
wherein the at least two connectors are positioned at said surface substantially symmetrically with respect to the first axis.

11. A system according to claim 1, further comprising:
a fluid delivery device that includes a tubular channel dimensioned to be removably inserted into the second input port and, upon translation along the second axis, removably housed by and within the second output port,
wherein said tubular channel is dimensioned such that,
when a proximal retaining element of the fluid delivery device is cooperated with the second input port to affix the fluid delivery device therein and/or temporarily immobilize the fluid delivery device therein,
an output aperture of the tubular channel is not inside the tubular structure or is substantially flush with an output aperture of the tubular structure.

12. A system according to claim 1, further comprising a plug device that includes:
a flexible rod of material dimensioned to be removably inserted into the second input port and, upon translation along the second axis, removably housed by and within the second output port, and
a head of the plug device supporting a proximal end of the flexible rod of material is cooperated and dimensioned to fittingly close the hollow of the second input port when the flexible rod of material is removably inserted therethrough and into the tubular structure of the second output port.

13. A system according to claim 1, comprising the external interrogator apparatus that is dimensioned to fit into the first input port in contact with said surface transverse to the first axis and that is configured
(i) to deliver light between an optical component of the interrogator apparatus and the first output port through the first input port aperture, and/or
(ii) when the first output port contains a thin-film coating configured as an electrode, to electrically connect said thin-film coating to electronic circuitry of said system.

14. A system according to claim 13, wherein the interrogator apparatus includes a microscope and/or a hub device operably connecting said thin-film coating when the interrogator apparatus is inserted into the first input port.

15. A system according to claim 1, wherein the at least two connectors include magnets and/or openings in said surface transverse to the first axis.

16. A method comprising:
with the use of the system according to claim 1, having a portion of the hand-held device holder partially placed into a body of a target object such that both the first and second output ports are located below an outer surface of the body of the target object while a portion of the outer surface of the holder body is substantially in contact with said outer surface of the body of the target object, carrying out at least the following steps:
propagating an electromagnetic signal through the first input port aperture to impinge onto a target area of the target object, wherein the target area is at least partially within a field-of view of said optical element of the first output port; and
delivering a chosen substance of first and second pre-defined substances to said target area through the second input port and through the tubular structure of the second output port without having said chosen substance come in contact with an inner surface of the tubular structure of the second output port.

17. A method according to claim 16, wherein each of said propagating and said delivering is effectuated without repositioning and/or reorienting the hand-held device holder.

18. A method according to claim 17, wherein said delivering includes transmitting the first pre-defined substance through the second input port and through the tubular structure of the second output port and then transmitting the second pre-defined substance after having ceased said transmitting the first pre-defined substance.

19. A method according to claim 16, comprising:
removably inserting a fluid delivery device having a tubular channel into the tubular structure of the second output port and transmitting the chosen substance through said tubular channel.

20. A method according to claim 16, comprising: when the tubular structure of the second output port is empty, removably positioning a flexible rod of a plug device therein by translating said rod along the second axis through the second input port.

21. A method according to claim 20, comprising: substantially simultaneously with said removably positioning, fittingly cooperating a head of the plug device, attached to the proximal end of the flexible rod, with a hollow of the second input port such as to substantially removably close said hollow.

22. A method according to claim 16, wherein each of said propagating and said delivering the first pre-defined substance and said delivering the second pre-defined substance is effectuated without repositioning and/or reorienting the hand-held device holder.

23. A method according to claim 16, wherein:
(23A) the propagating includes propagating light to and/or from the target area through the optical element and the first input port aperture; and/or
(23B) the propagating includes propagating an electrical signal through the first input port aperture along an electrically-conducting element when said electrically-conducting member is carried by the optical element.

24. A method according to claim 23, wherein said propagating light to and/or from the target area includes propagating light through an objective of a microscope removably affixed in the first input port such as to be supported at said target object with only said hand-held device holder.

25. A method according to claim 16, wherein delivering the chosen substance includes delivering a fluid.

26. An optogenetic apparatus comprising:

a device holder having:

a first input port configured to receive along a first axis and removably affix therein an interrogation device, a first output port completely defined by an optical lens that extends from an aperture formed in an outer surface of a body of the device holder outside the outer surface substantially coaxially with the first axis, a second input port having a hollow with a second axis that is inclined with respect to the first axis, and a second output port fluidly connected with the second input port and including a tubular structure extending along the first axis;

and the interrogation device that is dimensioned to fit into the first input port and that is configured (i) to deliver light from an optical component of the interrogation device and through the optical lens, and/or (ii) when the first output port contains a thin-film coating configured as an electrode, to electrically connect said thin-film coating to electronic circuitry of said apparatus.

27. A method comprising:

with the use of the apparatus according to claim 26:

delivering light between a microscope system of the interrogation device and a target area defined by a field-of-view of the optical lens; and subjecting the same target area to interaction with a pre-determined substance by delivering the pre-determined substance through the second input port and the second output port without making contact between the pre-defined substance and either of the hollow and an inner surface of the tubular structure.

* * * * *